United States Patent
Abeles et al.

(10) Patent No.: US 7,912,768 B2
(45) Date of Patent: Mar. 22, 2011

(54) FLEXIBLE AND ADAPTIVE ACCRUAL METHOD AND APPARATUS FOR CALCULATING AND FACILITATING COMPLIANCE WITH TAXES AND OTHER OBLIGATIONS

(75) Inventors: Gary Evan Abeles, Verona, NJ (US); Alan Stuart Kaplan, Short Hills, NJ (US)

(73) Assignee: DynaTax Solutions, Ltd, Verona, NJ (US)

( * ) Notice: Subject to any disclaimer, the term of this patent is extended or adjusted under 35 U.S.C. 154(b) by 0 days.

(21) Appl. No.: 12/576,595

(22) Filed: Oct. 9, 2009

(65) Prior Publication Data

US 2010/0036760 A1   Feb. 11, 2010

Related U.S. Application Data

(63) Continuation-in-part of application No. 11/623,083, filed on Jan. 14, 2007, application No. 12/576,595, filed on Oct. 9, 2009.

(60) Provisional application No. 60/862,474, filed on Oct. 23, 2006, provisional application No. 61/103,949, filed on Oct. 9, 2008.

(51) Int. Cl.
*G06F 17/22* (2006.01)
*G06Q 40/00* (2006.01)

(52) U.S. Cl. .............. 705/31; 705/36 T; 705/39; 705/40

(58) Field of Classification Search ................... None
See application file for complete search history.

(56) References Cited

U.S. PATENT DOCUMENTS

| | | | | |
|---|---|---|---|---|
| 5,358,278 | A  * | 10/1994 | Ellis | 281/31 |
| 6,631,358 | B1 * | 10/2003 | Ogilvie | 705/39 |
| 6,789,189 | B2 * | 9/2004 | Wheeler et al. | 713/156 |
| 7,373,328 | B1 * | 5/2008 | Butcher, III | 705/39 |
| 2003/0208445 | A1 * | 11/2003 | Compiano | 705/40 |
| 2004/0015438 | A1 * | 1/2004 | Compiano et al. | 705/40 |
| 2004/0093303 | A1 * | 5/2004 | Picciallo | 705/39 |
| 2005/0075975 | A1 * | 4/2005 | Rosner et al. | 705/40 |
| 2008/0071641 | A1 * | 3/2008 | Olson | 705/26 |
| 2008/0103960 | A1 | 5/2008 | Sweeney | |

OTHER PUBLICATIONS

PCT Search Report dated Dec. 3, 2009 of PCT Application No. PCT/US2009/060154 filed Oct. 9, 2009.

* cited by examiner

*Primary Examiner* — F. Ryan Zeender
*Assistant Examiner* — Faris Almatrahi
(74) *Attorney, Agent, or Firm* — Vern Maine & Associates

(57) ABSTRACT

A computer-based system and method calculates and facilitates revenue accrual, for making larger, less frequent payments of estimated taxes or other obligations. Payer preferences are applied to satisfy variable payment intervals, amounts, and available resources. The obligation, required payments, and set-aside schedules are recalculated as needed, under payer and/or system control. Excess accruals are minimized; set-aside schedules are configurable. The system may be self-contained, handheld, or accessed remotely. Automatic datalinks move information and command fund transfers from the payer's bank, to accrue funds and make payments to other accounts. A service host may support a plurality of payers to make set-asides and payments at various levels as needed, on an individual or batch basis, including individual taxpayer enrollment for batch file tax payments by service providers. Some embodiments can be embedded to enhance the capabilities of other systems.

14 Claims, 13 Drawing Sheets

FLEXIBLE AND ADAPTIVE ACCRUAL METHOD AND APPARATUS FOR CALCULATING AND FACILITATING COMPLIANCE WITH TAXES AND OTHER OBLIGATIONS

RELATED APPLICATIONS

This application is a continuation-in-part of U.S. patent application Ser. No. 11/623,083, filed Jan. 14, 2007, which claims the benefit of U.S. Provisional Application No. 60/862,474, filed Oct. 23, 2006, both being incorporated herein by reference in their entirety for all purposes. This application also claims the benefit of U.S. Provisional Application No. 61/103,949, filed Oct. 9, 2008, incorporated herein by reference in its entirety for all purposes.

FIELD OF THE INVENTION

The invention relates to systems and methods for facilitating the payment of financial obligations, and more particularly to facilitating compliance with estimated tax payments and other financial obligations.

BACKGROUND OF THE INVENTION

In the United States, the Internal Revenue Service (IRS) reports that employees having payroll income with mandatory withholding amounts deducted from their pay are 98% tax compliant, clearly demonstrating that systematic set-asides of tax liabilities on a frequent, periodic basis, typically every week or every two weeks, almost entirely relieves taxpayers, and their accountants, of the wasteful and worrisome burden of delinquencies, penalties, enforcements, and workout plans. In contrast to this scenario, the IRS estimates that out of the 29 million self-employed individuals in the United States, only 40% are compliant in paying their estimated taxes in full and on time.

The direct financial consequence of non-compliance is illustrated in the following table, which is based upon a single US resident, self-employed, using the standard deductions for tax year 2007, who makes no estimated tax payments:

TABLE 1

| Income | Tax | IRS Underpayment Penalty |
|---|---|---|
| $ 30,000 | $ 6,717 | $ 306 |
| $ 50,000 | $12,990 | $ 588 |
| $100,000 | $31,810 | $1,448 |

There are also indirect, quality-of-life consequences that can arise from estimated tax non-compliance. The IRS can file tax liens and the individual's credit, reputation, and peace of mind can be impaired. The individual may then be afraid to maintain a bank account due to fear of an IRS levy. It may become difficult for the individual to lease a car, buy a house, or obtain a credit card due to impaired credit. The filing of separate tax returns to keep a spouse's credit clean may result in the unnecessary payment of thousands of dollars in extra taxes, due to the bracket break between MFS (married filing separately) and MFJ (married filing jointly). And ultimately, a delinquent taxpayer, out of desperation, may stop filing tax returns altogether, and then may become liable for additional civil and criminal penalties.

One approach for a self-employed individual is to divide the estimated annual tax liability into smaller amounts that can be set aside monthly, weekly, or according to whatever set-aside period the individual prefers. For example, the individual can establish a separate set-aside bank account for accumulating estimated taxes, and can arrange for his or her bank to automatically transfer a fixed amount from a checking account into the set-aside account every week, every month, or according to whatever set-aside period the individual chooses. Estimated taxes can then be paid from the set-aside account as they come due.

This set-aside practice has been recommended to clients by more than 70% of accountants surveyed, yet it is almost never followed, due to many drawbacks and complications. In the US, estimated tax payments are due on April 15$^{th}$, June 15$^{th}$, September 15$^{th}$, and January 15$^{th}$. These due-dates divide the tax year into estimated tax intervals which vary in length from 8 weeks to 18 weeks, or from two months to four months. Therefore, simply dividing the annual tax liability into equal, smaller amounts to be set aside every week or every month will result in shortfalls and penalties in two quarters. The set-aside amount can be manually recalculated and adjusted for each estimated tax interval, but this can be burdensome to the tax payer, and will result in significant fluctuations from interval to interval in the amounts transferred to the set-aside account.

In addition, self-employed individuals frequently receive their incomes at unequal and even unpredictable rates, and the total amount of income for a self-employed individual's tax year may be difficult to predict. This can lead to frequent adjustment of the estimated tax liability, and frequent re-calculation of the set-aside amounts, as income fluctuates during the course of a tax year. And even if self employment income is somewhat steady and predictable, adjustments may be required after calculation and payment in April of the previous year's taxes.

Cash shortfalls may also necessitate adjusting or missing some periodic set-asides, or even underpaying or missing an estimated tax payment, and may therefore require re-calculation and adjustment of the set-aside amounts. Beginning the set-aside process after a tax year has begun can further complicate the scheduling of appropriate set-asides, and may require adjustment of the set-aside amounts so as to compensate for estimated tax payments that have already been missed and/or overpayments that have already been made.

In addition, an individual may be reluctant to accrue funds in advance of estimated tax payments in case an unexpected need for cash should arise, for example due to an unexpected self-employment expense or investment opportunity.

For the reasons given above, many self-employed individuals and business owners (many of whom lack sufficient regimentation and discipline) have found it too difficult and too burdensome to calculate and set-aside appropriate amounts of estimated tax revenue on a frequent, regular basis, despite the clear and significant benefits that would be realized therefrom. For example: $19.25 per week (which is highly affordable), would add up to over $1,000 dollars at the end of a year (which is far less affordable), yet this approach is rarely implemented.

While the preceding discussion is focused on estimated tax payments, other circumstances can give rise to similar revenue set-aside best practices, needs, and difficulties. For example, when income is unpredictable, it can be difficult to calculate appropriate set-aside amounts for payment of child support, alimony, church contribution commitments, retirement savings, home mortgages, savings accounts, emergency funds, and such like. In other examples, the financial obligation itself may vary, depending on the amount and timing of current income rather than a prior year income or tax, or on some other current variable such as sales, or even a nonfinancial variable such as incremental usage of a resource, resulting in a varying obligation that affects an optimal schedule of payments. In some circumstances, such as church "tithing" contributions, the total amount to be paid can depend on a payer's income, requiring that set-aside amounts be adjusted according to changes in actual and/or predicted income.

SUMMARY OF THE INVENTION

In one aspect of the invention, there is provided an apparatus and method of use thereof which enable a self-employed taxpayer or a payer of another financial obligation to calculate and set aside small amounts of money from an income stream or other monetary source on a frequent, periodic basis in preparation for making larger, less frequent, required payments during a fiscal year or other payment term. This helps to avoid underpayments and can minimize overpayments and/or payment amount fluctuations under circumstances where the required payment periods, and/or the required amounts due, may be variable.

In another aspect of the invention, a system of the invention can be characterized as a computer-enabled enterprise system having various points of user interface and account access or control for making withdrawals and deposits. The system may incorporate multiple programs, tables, and a synchronizing engine, accepting instructions and data inputs, and executing specialized algorithms that facilitate the automated satisfaction of obligations according to user preferences.

In still another aspect of the invention, there is provided the capability for scheduling of different set-aside amounts during different payment intervals in anticipation of expected changes in the payer's income and/or ability to pay during the payment term. In yet other aspects of the invention, modification and/or cancellation of individual set-asides is facilitated, as well as recalculation and readjustment of the remaining set-aside schedule, without undue burden to the payer, whenever the payer's estimated total income, rate of income, amount due, and/or ability to pay fluctuates during the payment term.

Still another aspect of the invention provides for software operable on a general purpose computer, hand-held device, or other programmable computing device, the software being accessible to a user either through an interface provided by the apparatus itself, or by communication with the apparatus over a network, such as the Internet, to a computer-enabled host system. The method may include input by the user of an estimated annual tax liability, or another actual or estimated financial obligation, and the required payment intervals therefore, along with other information and preferences relating to satisfying the obligation. In various embodiments, user-specified preferences include selecting or specifying of a set-aside period such as weekly, bi-weekly, monthly, etc, rounding of payment amounts to the nearest whole-dollar, etc, with a compensating reduction of the last payment of the interval, and choice of whether to minimize the set-aside amounts, which typically requires differing set-aside amounts and/or differing set-aside periods during different payment intervals, or to equalize the set-aside amounts and periods, which typically requires that a surplus of funds be set aside during some payment intervals. The system then calculates an appropriate set-aside schedule of dates and amounts, and re-calculates them as needed according to updated information provided by the user and/or obtained automatically by the apparatus, for example by communication with the user's bank or third party payment service.

In various embodiments, the invention can provide notifications to the user, for example reminding the user when it is time to set funds aside. These notices can prompt a payer to review and approve or optionally to change a set-aside amount, delay it for some amount of time, or cancel it entirely. And in some embodiments, the present invention can provide input data for an online and/or batch payment system, such as is described in U.S. patent application Ser. No. 11/623,083, publication no. 2008/0097878, hereby incorporated in its entirety for all purposes. In other embodiments, the apparatus of the present invention can be configured to provide input data to an existing payroll system, or to an automatic payment debiting system deployed by a service bureau, taxing authority (the IRS EFTPS system is an example), or another creditor. And in yet other embodiments the present invention can be embedded within another type of system, such as a creditor's accounting system, so as to enhance the internal capabilities of the system into which it is embedded, such as by calculating, scheduling, notifying, adjusting and/or facilitating debit and/or credit payments.

Some embodiments of the present invention can be configured to accept additional information pertaining to a user, such as for payers, email and street addresses, phone and fax numbers, birth date, social security number or taxpayer identification number, employer identification number, bank account information, adjusted gross income from the previous year, and such like, so as to enable the embodiment to initiate the setting up of escrow or holding accounts (which are often interest-bearing), and to establish an electronic payment account with a taxing authority or another creditor. Relevant creditor information can likewise be accepted into the system so that both parties, payor and payee, are suitable identified and linked with the respective accounts. This enrollment information feature also enables embodiments to provide pre-authorized payment instructions on a payer's behalf to a bank, credit union, brokerage, or other type of account-holding institution, and/or to a taxing authority, creditor, etc.

In certain embodiments the system can communicate with institutions such as the IRS and/or a user's bank or other financial institution, so as to detect relevant financial events, such as may be or result in changes in the relevant tax schedule, or taxes or other obligations owed, set-aside amounts missed, insufficient funds to make a payment, bank account problems, force majeure, etc. From such information, the system may recalculate the remaining periodic set-aside amounts and dates accordingly. For example, some embodiments are able to automatically adjust set-aside amounts based on a bank account balance and/or amounts of deposits and withdrawals that are made to/from the source account, representing the user's available funds. And some of these embodiments are able to detect and/or initiate catch-up payments for current and previous quarters and/or years.

Some embodiments provide for special escrow accounts that are able to be conveniently opened, as compared to regular escrow accounts that are more restricted due to anti-money laundering regulations. These embodiments and escrow accounts also serve as a buffer by keeping confidential source account information details away from taxing authorities and creditors who may be in an adversarial relationship with the payer. Certain of these embodiments can provide for the payment of interest on funds in set-aside escrow accounts, and can allow for the refunding of accumulated set-aside funds back into the payer's source account, or a designated further account, at any time, and for any reason.

Various embodiments are able to provide reports on past activities and future actions. Some embodiments provide for updating database records within the system to reflect the change from payments planned, to payments made, including an interim period that may be required for assuring payments made from the donor account have actually cleared, or been confirmed, at the receiving account. And some embodiments include a rounding feature that enables all set-asides to be in whole dollar amounts, and compensates by adjusting the last set-aside amount of the payment interval as needed so as to provide the desired total fund accrual for the payment interval.

In addition to individual payers of taxes and other financial obligations, the present invention includes embodiments applicable to user groups, businesses, trade associations, professional societies, and all types of institutions and business entities that take on large financial obligations as payors or payees. Embodiments of the present invention are applicable to many types of fixed or variable financial obligations, such as mortgage payments, insurance premiums, retirement plan contributions, and such.

More broadly stated, the invention is applicable to any fixed or variable obligation for payment by a first party or payor to a second party or payee that may be based on any one or combination of things including but not limited to accrued income, judgment, or contract, such as for consumption, utilization, or sales of goods or services by the first party or another user party for whom the first party is accountable, where the obligation or payments to the second party may be characterized as any of taxes, bills, expenses, loan payments, commissions, fees, royalties, contractual satisfaction or the like, the obligation, including the payment terms, being fixed or calculable by a specified formula, and optionally by performance of the first party and/or its agents during the interval, with payments typically but not necessarily due on one or more specified dates over the interval or shortly thereafter. The invention contemplates among its variations multiple first parties obligated to a single second party, such as in the case of taxpayers and a tax authority, and a single first party obligated to multiple second parties, such as in the case of a single distributor of goods of several manufacturers who are each creditors, or a household that needs to balance and juggle an income stream to satisfy a plurality of creditors. The invention provides improved means of managing this process, including the introduction of computer enhanced data management and third party facilitators and mechanisms that provide more information and give more latitude and control to the first party payor for more optimal management of the obligation and payments thereunder, all of which makes payment performance more reliable for the second party payee or collection service.

The enhanced data management capability of the present invention can include the adjustment of amounts, schedule preference, and actual financial performance to be governed by a set of pre-determined decisions and rules. In some embodiments, programmatic implementations of the RETE algorithm applied to the data management of the invention, in conjunction with the adjustable nature of the invention as described herein, enable the automated granting of latitude with respect to the obligation and reduction of human collection efforts, as work-out plans can be predetermined and implemented as a set of rules. Case-by-case individual and collective experience-based adjustments of work-out payment arrangements by means of monitoring results and refining collection rules further eliminate labor, based reasoning, and adjusting technologies, such as inference engines, and ontologies with rational agents, as two examples.

Embodiments can benefit accountants and other tax professionals who can use, recommend, and enroll their clients in a user group, as well as business owners, partnerships, networks of business people, and such like. Businesses bound by contracts as either payor or payee of such obligations will likely make extensive use of the invention whenever flexible and/or adaptive set-asides are beneficial. Federal, State, City, and Municipal Governments, as well as creditors, debt collection agents, and such like, can also use the invention as a calculation, notification, and/or a collection device, or simply provide the online or downloadable use of the periodic set-aside calculator of the present invention, as they now do for payroll withholdings. Charitable organizations can also offer embodiments of the present invention to their patrons and congregations for tithing and other contributions.

In particular, it can be beneficial to a creditor or to a debt collection agent to provide use of the present invention to its clients, since the flexibility, adaptability, and ease of implementation of the present invention, as well as the ability of the present invention to provide set-aside schedules that are practical for payers to follow, can aid indebted clients in becoming and remaining compliant with their obligations.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
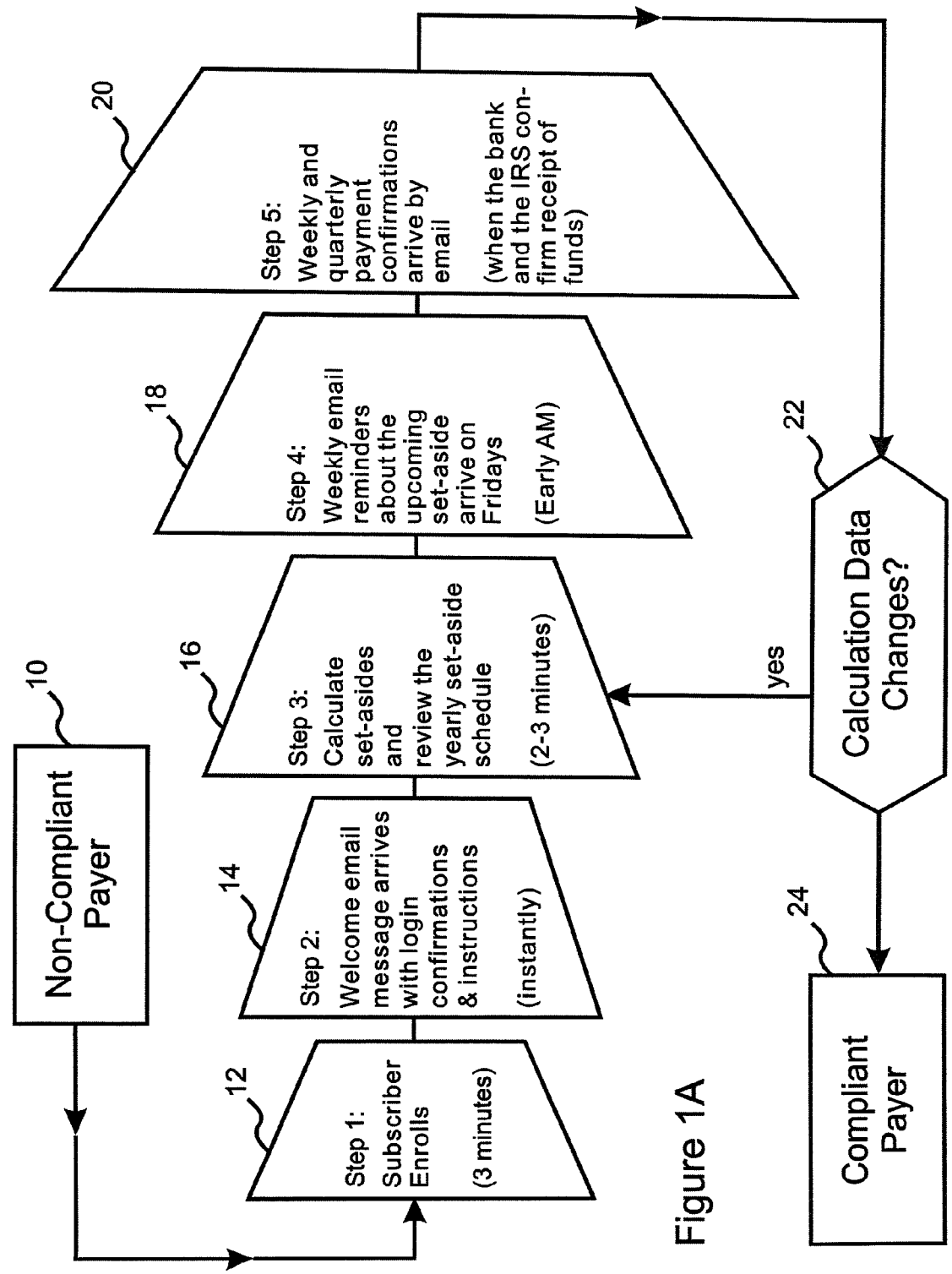
FIG. 1A is a flow diagram illustrating steps in a preferred embodiment that transform a non-compliant payer of a financial obligation into a compliant payer.

Unless specifically stated otherwise, as apparent from the discussions herein, it is appreciated that throughout the specification discussions utilizing data processing or manipulation terms such as "processing", "computing", "calculating", "determining", or the like, typically refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Practitioners of ordinary skill will recognize that a financial account in a computer system is a set of data stored in the system that are related to the user or account owner/payer, or the taxing authority or other creditor, including data representing the amount of money held in the source account or in an escrow account for the benefit of satisfying the obligation owed to the taxing authority or other creditor. Storage of the data is typically by means of well known mass storage devices, including disk drives, optical drives or other data storage technologies.

Various embodiments of the invention may incorporate a local and a remote system. There may be a local computer or computing device, handheld or otherwise, with a memory, processor, monitor or output device, and mass storage device. The local computer may include an operating system and supporting software such as but not limited to a web browser or other suitable local interpreter or software, and may operate a local client process or software, such as but not limited to JavaScript or other suitable code operated by the supporting software, to produce an interactive display such as a web page for providing a customer with a graphical user interface for data and instruction entry and receipt of reports.

The local computer may accept user input, maintain customer accounts including automatically tracking and/or recording estimated tax payment requirements for the user, establish security measures, for example, verifying user identity, and automatically deducting from one or more user accounts amounts necessary to meet a financial obligation, such as but not limited to a tax authority payment requirement. An automated payment server may be used for tracking estimated tax payments of one or more users and a bank server, selected by the user, may be a source from which monies may be periodically deducted and set-aside for tax payments. An automated payment server may store in a database, for example, estimated tax payment requirements for the customer, security information and account information, which may be transmitted to the bank server for executing payment operations. In various embodiments, the automated payment server and bank server may be operated by the same or different controlling entities, for example, an automated payment service or bank service, respectively.

In some embodiments, an automated payment server may record a history of payments for each user as an account balance, for example, associated with each user's accounts. The bank server may include a database, for example, for recording customer account details and histories. In some embodiments, users may have access to the transaction history of their accounts, for example, using a bank website interface. In some embodiments, the user may have control of and may adjust the amount or schedule of the automatic or periodic payments or may block or overwrite such payments.

In some embodiments, an automated payment server may transmit a signal or message to the bank server, for example, to periodically impound or transfer an amount of money from a source account held by the user. Messages may include data packets and may be transmitted and/or received between the user's local computer, automated payment servers, banks servers, credit card machines, ATMs, and/or other payment devices. According to embodiments of the present invention, the bank server may periodically impound or set aside into another account such as an escrow account, an amount of money from the user's source account, where each amount set aside is less than the estimated tax or next payment obligation, and the combined value of the amounts set aside by the due date of the next estimated payment obligation substantially match the estimated payment due.

The bank server may automatically set-aside monies from the user source account, periodically, for example, hourly, daily, weekly, monthly, quarterly or annually. In an exemplary embodiment, monies may be automatically set aside at a frequency, for example, on a weekly basis, to minimize the amount of monies set-aside at one time. Once sufficient set-aside funds are accumulated, for example, in a third-party account such as an escrow account, and a payment is due to the taxing authority or other creditor, the payment may be made from the third party account. In another embodiment, monies may be automatically set-aside when sufficient monies have accumulated in the user's monetary source account, for example, when a monthly or a random earning of some sort is received. In yet another embodiment, monies may only be set-aside upon approval from the user. The set-aside monies may be submitted to the appropriate taxing authority or other creditor automatically by a third party on behalf of the user on the due date for the next payment required.

In some embodiments, the automated payment server may manage the payments directed to a principle obligation while taking into account other required payments for obligations such as monthly bills, mortgages, or other business or personal expenses. Based on financial information, for example, provided by a user, a fixed, variable, or estimated amount of monies may be reserved or set-aside for various known or predicted expenses other than the principle obligation. For example, in some embodiments monies are automatically set-aside from a user's source account when the monies in the account, excluding monies allocated to or set-aside for other payments or expenses, are determined to be sufficient. Principle and other prospective obligations of a user may be prioritized in time and amount by user-imposed upper and lower set-aside limits and periods, and order of fulfillment.

In some embodiments, the system may be programmed to set-aside monies from various source accounts of a single user. For example, a monetary source may include a bank account, a stock portfolio, a trust fund, etc. For example, if monies are to be set-aside from stocks, the execution of the set-aside instruction may include automatically selling a certain unit value of stocks. Alternatively, the execution of the set-aside instruction might include automatically borrowing money from the bank hosting the account, with the stock portfolio as collateral. The user and/or system may be further configured or combined with other programs to use preferential planning to select the optimal stocks to sell in order to acquire the necessary monies for the set-aside and/or payment requirement.

In another embodiment, the execution of set-aside instructions may not include transferring money, but placing restrictions, warnings or limitations on the customer's use of or access to all or a portion of money in the source account. For example, if a customer attempts to withdraw a portion of money allocated for a planned tax payment from the source account, the transaction may be blocked or a warning sign may appear on a payment interface such as an automated teller machine (ATM) or a graphical user interface of a bank or transaction service website. In some embodiments, the user may have control of and may block or overwrite such restrictions.

By the date a required payment is due, sufficient funds for the payment should have been accumulated by the periodic set-aside mechanism. By the payment due date, an automated payment server may recalculate the required payment and deduct it from the customer's escrow or set-aside account and may transmit payment instructions via the Internet or otherwise to the bank server. Payment instructions, based on the calculated payment requirement, may include authorization for processing a payment or transfer of funds, the amount to be paid and the source and destination for the transfer of funds. The bank server may execute a payment, according to the payment instructions.

In some embodiments, payments to the taxing authority or other creditor may include submitting a taxpayer or user's personal and/or financial information, including for example social security number associated with the user, the amount to be paid, and appropriate instructions and security data.

An automated payment server may include security and utility code to generate security or verification information; such verification information may be used to allow the appropriate user to monitor and/or control their accounts for payment of taxes or other selected obligations. Such verification information may also be used for metering or billing users for services enabled by the invention.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

With reference to FIG. 1A, the present invention is an apparatus and method for transforming a non-compliant payer of estimated taxes, or of another financial obligation, into a compliant payer 24. The invention facilitates the accrual of revenue on a frequent, periodic basis, without undue burden to the payer, in preparation for making larger, less frequent payments of the estimated taxes or other obligations that would otherwise be difficult to afford, under circumstances where the payment intervals, the amounts due, and/or the payer's ability to pay is/are variable.

As illustrated in FIG. 1A and in the simple embodiment of FIG. 2A (discussed in more detail below), the initially non-compliant payer 10, 200 begins by gaining access to the apparatus of the present invention 202, either by using a calculating device that is locally available to the payer, such as a personal computer or hand-held device, or by connecting to the apparatus over a network such as the internet. In some embodiments where the method is provided as a service over the internet, if the payer has not previously used the invention, the payer begins by enrolling as a subscriber 12, which results in an email being transmitted to the payer 14 containing login information.

Having become a subscriber and logged into the software of the invention, the payer is then prompted to enter his or her estimated annual tax liability 100, and the date(s) when payment(s) is/are due. For some embodiments, rather than entering a tax liability, the subscriber can enter data such as expected income, expected deductions, number of dependents, and previous year's tax liability, and the embodiment can calculate therefrom the expected tax liability and required estimated tax payments for the subscriber.

The subscriber can also enter preferences regarding how accrual set-aside amounts should vary over the course of a payment term. For example, the subscriber may be a teacher who earns more during the winter than during the summer, or the subscriber may work in construction and earn more during the summer and less during the winter. The subscriber may also have expenses that vary during the year, such as heating costs that are higher during the winter. Unpredictable changes and/or events may also occur during the tax year, and may even cause the payer to fall short in making the fund set-asides called for by the set-aside schedule. Embodiments of the present invention therefore allow a payer to adjust the set-aside amounts, both before the initial schedule calculation 16 and at any time during the payment term, so as to provide and maintain a schedule of variable set-asides that is practical for the subscriber to implement and to follow, as compared to a more rigid and less practical schedule of fixed set-asides that do not take into account the predictable and unpredictable variations in income, expenses, and other factors that typically occur during a tax year or other payment term.

In various embodiments, the payer can delay, change or cancel any set-aside or group of set-asides at any time. The payer can also make additional set-asides not included in the schedule, or withdraw funds that have been previously set aside, for example to meet an unexpected emergency or take advantage of an unanticipated opportunity. The set-aside schedule can then be re-calculated so as to take these actions into account.

After the subscriber has entered the required data and preferences, the invention then calculates 16 a schedule of set-aside amounts and set-aside periods, which the payer can review and modify as needed. During the payment term, some embodiments provide notifications 18 that serve to remind the payer to review and adjust the set-aside schedule, to set aside funds and/or to make payments. In other embodiments, the notifications simply inform the payer as to set-asides and payments that will be made automatically, and to further inform the payer when the payments have been made 20. If the tax liability, the payer's ability to pay, or any other factor varies during the course of the tax year or other payment term 22, the set-aside schedule can be reviewed and recalculated accordingly 16. Whether or not the set-aside schedule requires adjust during the payment term, by following the set-aside schedule the initially non-compliant payer is transformed by the invention into a compliant payer.

Figure 1B:
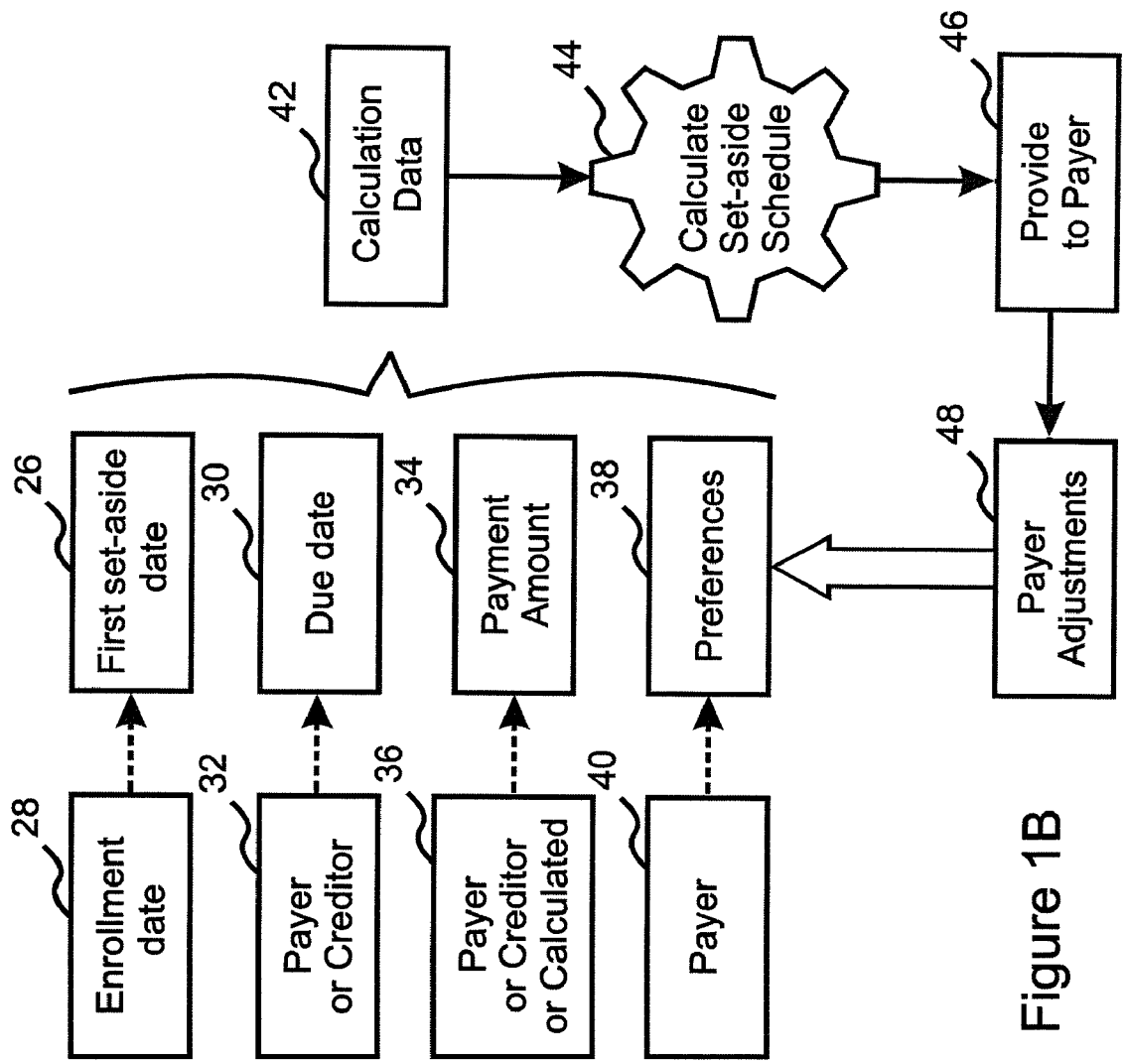
FIG. 1B is a flow diagram illustrating steps in an embodiment of obtaining calculation data, calculating a set-aside schedule, making adjustments, and re-calculating as needed.

FIG. 1B illustrates how in some embodiments calculation data is obtained, a set-aside schedule is calculated, adjustments are made, and the set-aside schedule is re-calculated as needed. A first set-aside date is determined 26, which could be the date of enrollment of the payer 28 in a service providing access to the invention, a beginning date of a payment term for the obligation, or any other date selected by the payer (for example, the first Wednesday following enrollment, or the first day of the next month following enrollment). The due date for payment of the obligation 30 is either directly entered by the payer or determined from another source 32, such as from the IRS, or a website maintained by another creditor. The payment amount is either entered directly by the payer, obtained from the IRS or from another creditor, or calculated using information pertaining to the payer 36. For example, in some embodiments the payer provides estimates of his or her income, deductions, and number of dependents, and the embodiment calculates an estimated tax obligation therefrom. Additional preferences 38 are also supplied by the payer 40, such as how frequently the payer wishes to set funds aside (e.g. weekly, by-weekly, monthly, etc), and how the payer wishes to vary the relative amounts of the set-asides. For example, the payer may wish to set aside equal amounts for all set-aside periods, the payer may wish to set aside larger amounts during periods when the payer expects to have a higher income (for example a construction worker may earn more during the Summer), or the payer may wish to set aside less during periods of high expense, such as during the winter when heating bills are high.

Collectively, the first set-aside date, the due date, the payment amount, and the other preferences represent calculation data 42 that can be used, possibly together with other data, to calculate a set-aside schedule 44. The set-aside schedule is provided to the payer 46, and the payer is allowed to make adjustments 48, either at the outset of the set-aside process or at any desired time after set-asides begin. For example, the payer's income may vary in unexpected ways, unexpected expenses may arise, the payment amount may change, and/or the payer may find it necessary to miss a set-aside. By making adjustments 48 to the calculation data 42 and re-calculating 44 the set-aside schedule, the embodiment is able to adapt to changing conditions, and to update the set-aside schedule so that it remains relevant and practical for the payer to follow.

Figure 1C:
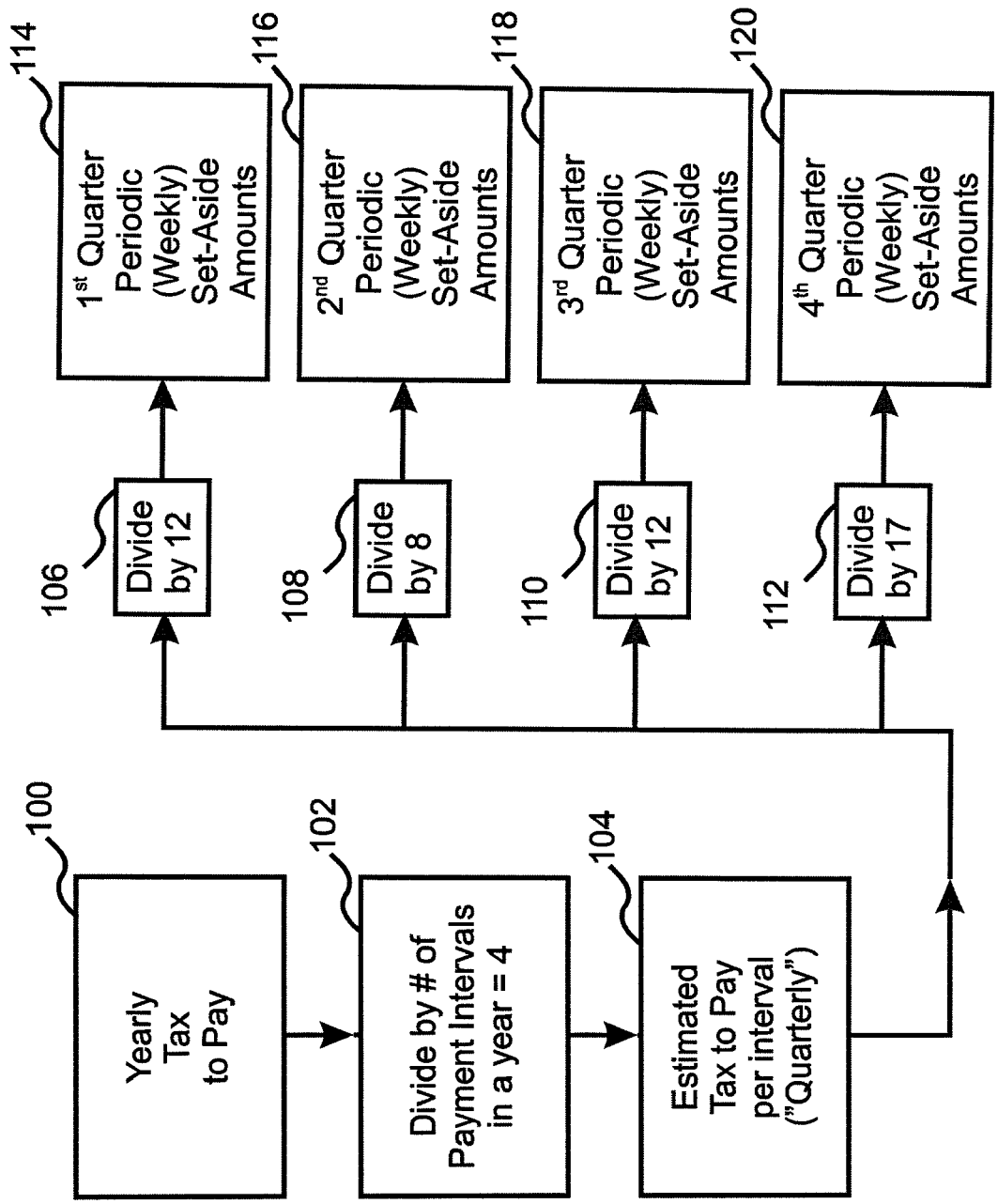
FIG. 1C is a flow diagram illustrating a set-aside calculation performed by an embodiment of the present invention wherein set-aside payments are made at equal intervals, and set-aside amounts are determined by dividing each quarterly payment by the number of full weeks in the quarter.

FIGS. 1C through 1G are illustrations of algorithms that are used in various embodiments to calculate set-aside schedules. With reference to FIG. 1C, in the case of estimated taxes being paid in the US, and assuming for the sake of simplicity that the tax year has not yet begun, the calculation begins by dividing the total tax obligation 100 by the number of payment intervals in the year 102, which is 4, according to the requirement to pay estimated taxes in the US on a quarterly basis. In other countries, the invention can accommodate other payment schedules including, tri-annual, semi-annual, or other tax submission intervals.

This provides the amount due 104 in each estimated tax "quarter." Of course, the actual estimated tax payment intervals are not equal 3-month quarters, but are intervals that can vary from 8-9 weeks in the second quarter to 17-18 weeks in the fourth quarter. In the embodiment of FIG. 1B, the software divides the amount due in each quarter 104 by the minimum number of weeks that can occur in that quarter 106-112, thereby deriving weekly set-aside amounts for each quarter 114-120. The set aside amounts will vary from quarter to quarter. For example, the amounts for the second quarter 116 and the fourth quarter 120 will differ by approximately a factor of two. However, the embodiment of FIG. 1B will ensure that adequate funds are set aside in time for each estimated tax payment, while allowing only modest set-aside amounts to be carried over from one quarter to the next. In some embodiments, the last set-aside amount of each quarter will be reduced or eliminated as needed so as to avoid carry-over to the next quarter.

The calculation illustrated in FIG. 1C can be expressed as:

$$S_n = (T/I)/P_i \quad (1)$$

where $S_n$ is the set-aside amount for payment period n, T is the total tax liability for the year, I is the number of payment intervals (Quarters) in the year (I=4 in the example of FIG. 1A), and $P_i$ is the (integer) number of complete set-aside periods in the payment interval i in which the n'th set-aside period occurs.

Figure 1D:
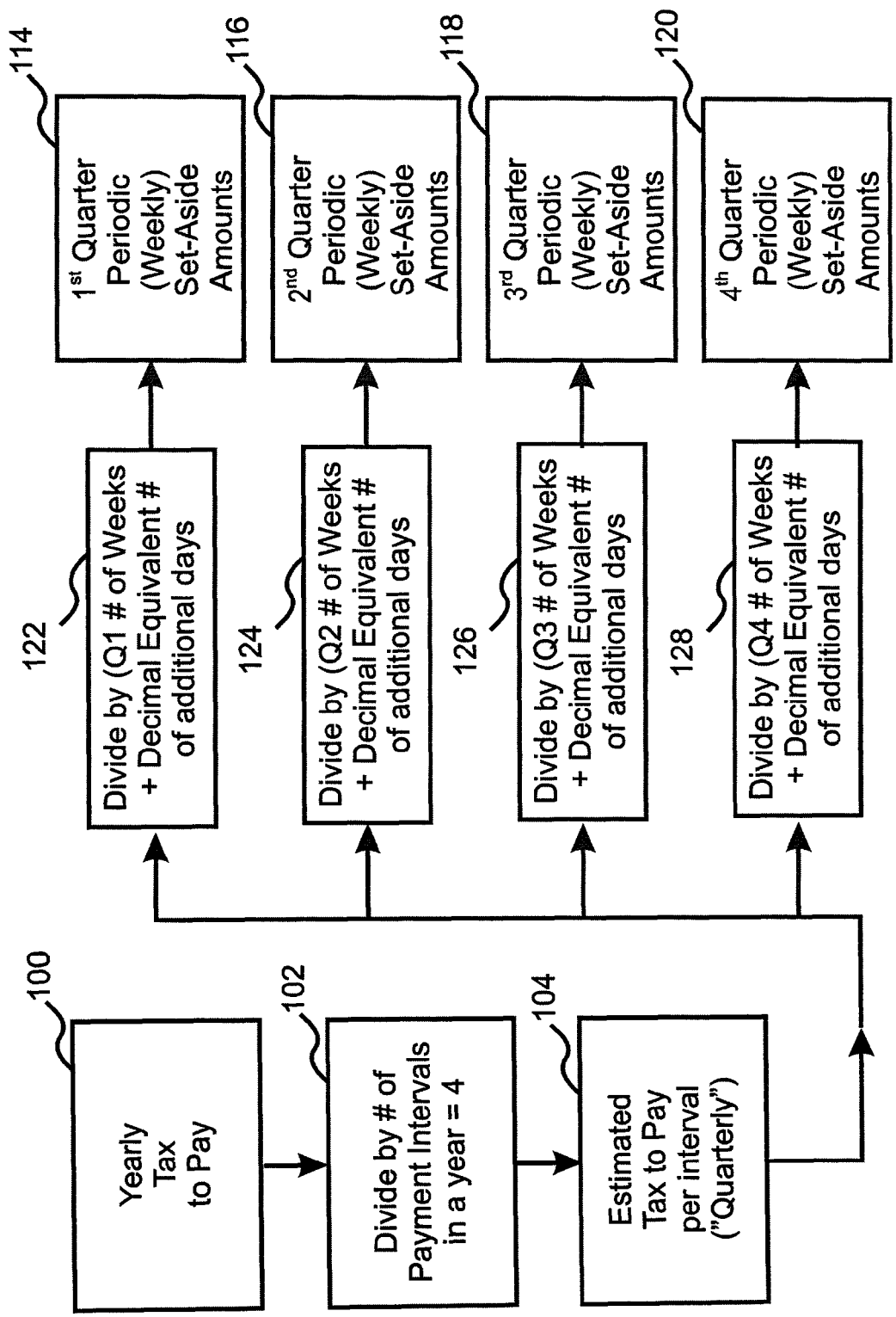
FIG. 1D is a flow diagram similar to FIG. 1A, except that fractional weeks are included in the number of weeks by which each quarterly payment is divided.

A slightly more sophisticated embodiment is shown in FIG. 1D. This embodiment recognizes that estimated tax quarters can include partial weeks, and so divides 122-128 the quarterly payment amounts 104 by numbers that include partial weeks. For example, if the second quarter actually includes 8 weeks and 5 days, the second quarter amount will be divided by 8 5/7, or 8.7143, where 0.7143 is the decimal equivalent of the additional 5 days, expressed as a fraction of a week.

The calculation illustrated in FIG. 1D can be expressed as:

$$S_n = (T/I)(L/D_i) \quad (2)$$

where L is the length (in days) of the set-aside period (L=7 in FIG. 1D), and $D_i$ is the number of days in payment interval i.

This approach, as compared to the embodiment of FIG. 1D, helps to minimize the carry-over of set-aside funds from one quarter to the next, and/or minimize the need for a reduced set-aside at the end of each quarter. The additional day in the first quarter of a leap year can be similarly accommodated. So as to avoid the possibility of insufficient set-aside, some embodiments adjust the date of the first set-aside, for example requiring the first set-aside to be paid upon commencement of the quarter, and/or require an initial payment of at least a partial set-aside.

Various other embodiments take partial set-aside periods into account by dividing the amount due in a quarter by the number of days in the quarter, and then multiplying by the number of days in a set-aside period (7 for one week, or 14 for two weeks, for example).

Figure 1E:
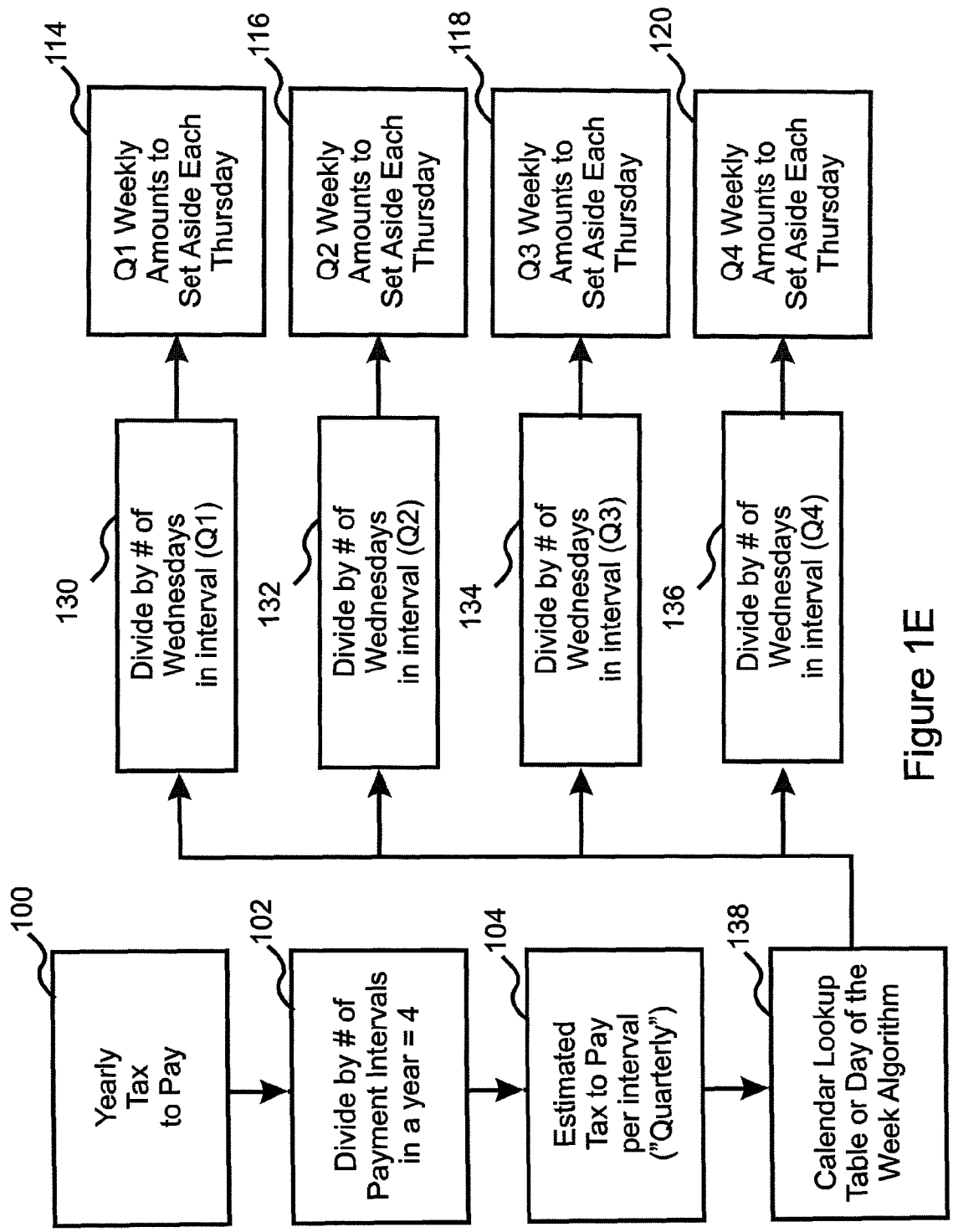
FIG. 1E is a flow diagram similar to FIG. 1B, except that set-asides are scheduled for a specific day of the week.

While the embodiments of FIG. 1C and FIG. 1D calculate an amount to be set aside each week, they do not specify precisely when each amount should be set aside. In the embodiment of FIG. 1E, a specific day of the week (Wednesday in this example) is designated as the set-aside day, and the amount due for each quarter 104 is divided by the number of Wednesdays in the quarter 130-136, as determined using for example a lookup table or day-of-the-week algorithm 138. It is assumed that the actual set-aside will occur on the same day that the instructions are transmitted to the bank.

The embodiment of FIG. 1E can support batch processing of periodic (weekly) transfers or debits to for a plurality of users, knowing that debiting from the user's account will usually take place the same day, or the next business day. In this example the transfer or debit batch instructions would be submitted on Wednesday, in time to be in the interest-bearing account and maximize interest earned over the weekend, if an escrow account (see prior art section on impounding), is used to hold the periodic tax set-asides until it is time to make a payment at the end of the tax submission interval. Having this occur on a same day or next day basis due to bank transfer processing time, or an interruption in the transaction due to a bank holiday, or force majeure, etc. still allows for a Friday receipt of funds. This embodiment also allows the user to keep and to use the funds in his or her account as a float, from the previous week until Tuesday at the earliest, and not lose the weekend interest on each periodic amount.

Figure 1F:
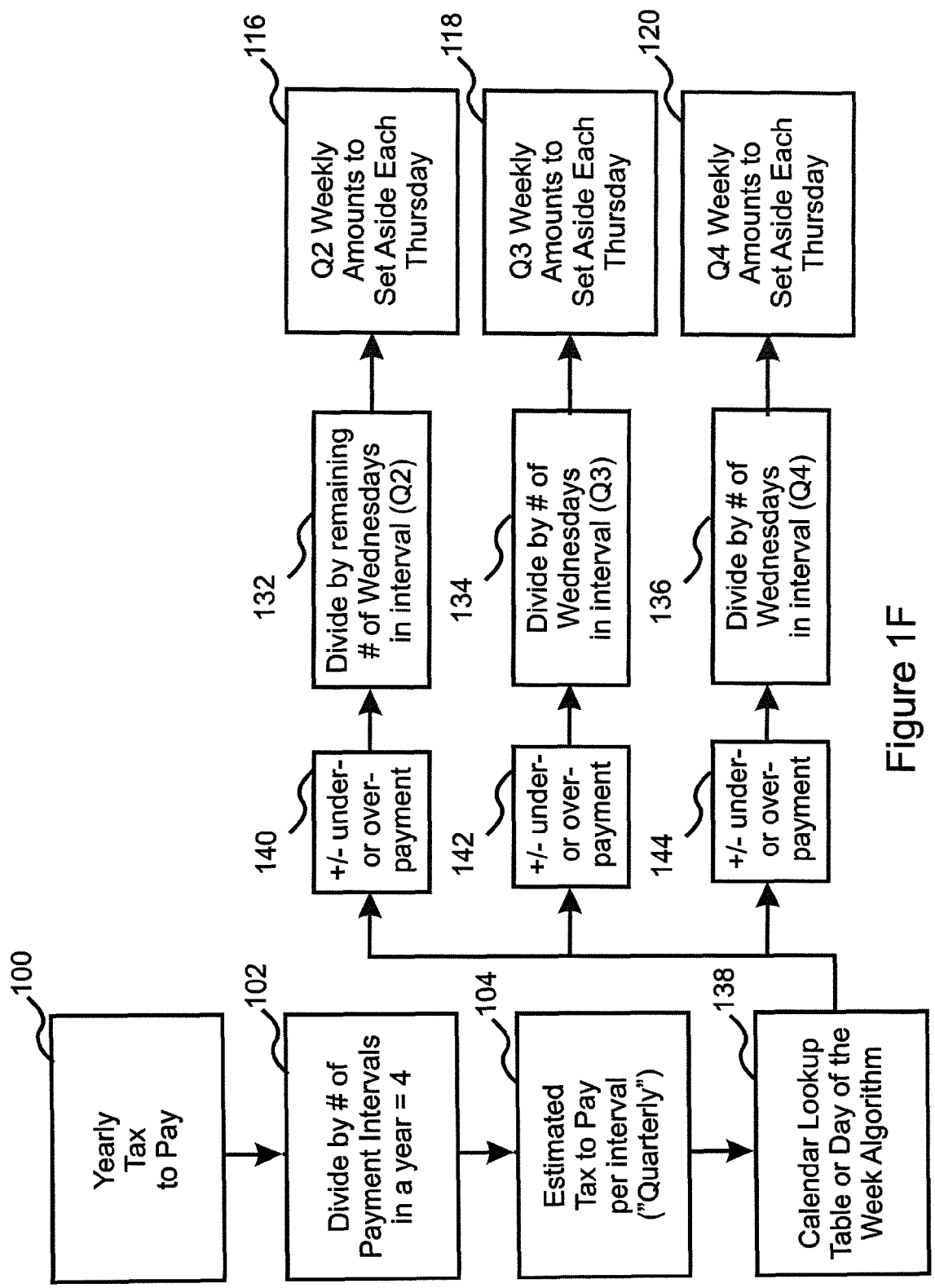
FIG. 1F is a flow diagram illustrating how partial years, underpayments, and overpayments are processed by the embodiment of FIG. 1C.

The embodiment of FIG. 1F recognizes that the periodic set-asides may not begin at the beginning of a tax year, and/or that there may be overpayments or underpayments resulting from a portion of the tax year that has already elapsed and/or from a preceding year that must be accounted for. In this embodiment, the user has the option to make up for any underpayments in a lump sum before calculating set-aside amounts. Or, optionally, additional amounts can be added 140-144 to any or to all remaining quarters according to any desired allocation so as to make up the deficit. Similarly, any overpayments can be apportioned 140-144 to any combination of remaining quarters according to user preference. For example, one option is to begin set-asides only after all overpayments and/or credits have been used. Another option is to apply any deficiencies or overpayments evenly across some or all of the remaining set-aside intervals of the tax year.

As a more complex example, assume that there is an overpayment O from the previous year, that periodic set-asides have begun only after K set-aside intervals have already elapsed, that the payer wishes to apply the overpayment to compensate for the payments missed during the elapsed periods, and to distribute the difference equally over the remaining set-aside periods, and that the payer has specified certain other specific set-aside adjustments $A_n$ applicable to at least some of the set-asides. Under these assumptions, the calculation illustrated in FIG. 1E can be expressed as:

$$S_n(T/I)(L/D_n) - \left(O - \sum_{j=1}^{K} S_j\right) / (N - K) + A_n \quad (3)$$

where N is the total number of set-aside periods during the entire tax year, given by $$N = \sum_{i=1}^{I} P_i \quad (4)$$

Figure 1G:
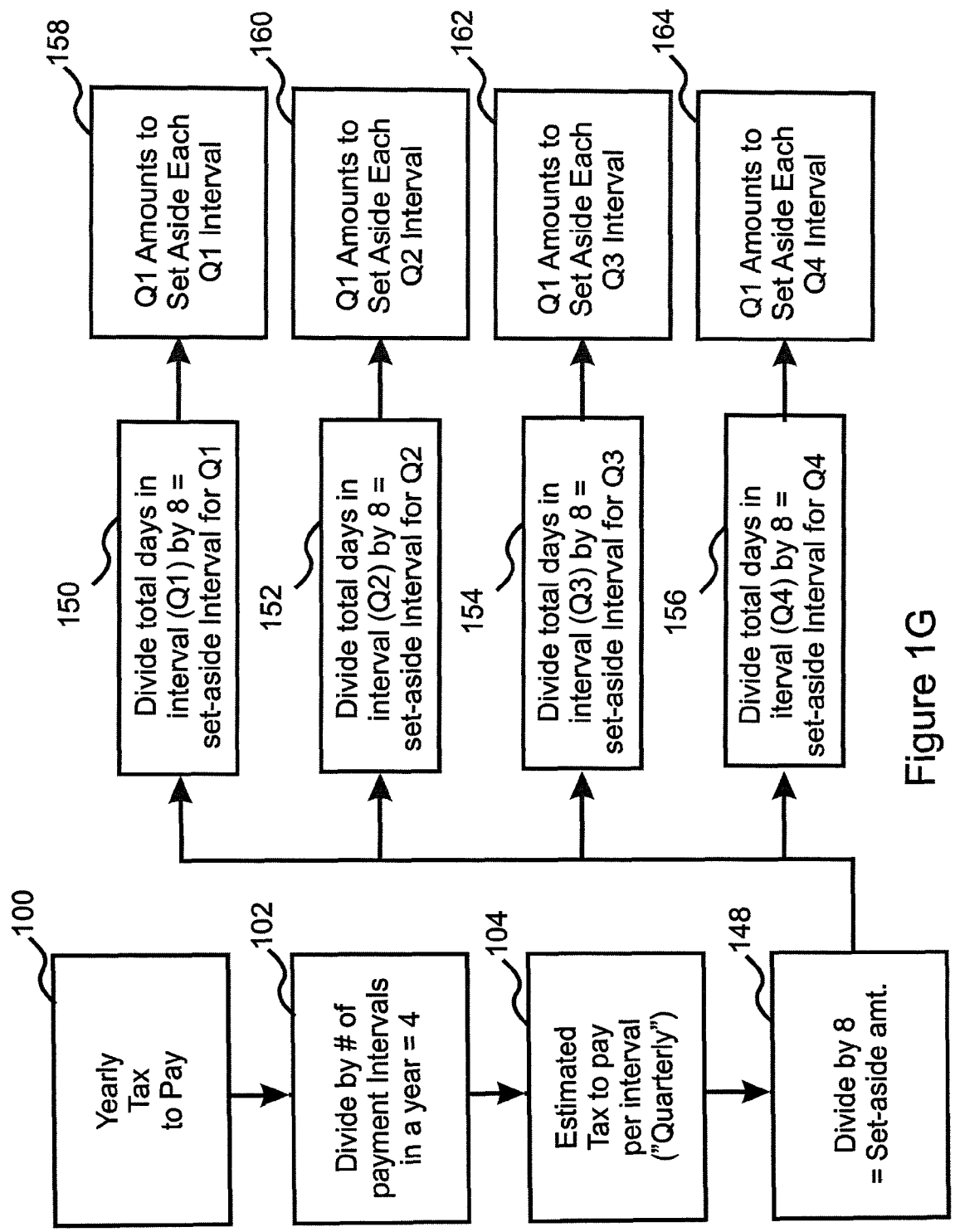
FIG. 1G is a flow diagram similar to FIG. 1A, except that all set-aside payments are equal in amount, while the intervals between set-aside payments are adjusted according to the differing lengths of the payment quarters.

FIG. 1G presents an embodiment in which the set-aside amount remains fixed during a tax year, while the set-aside period is adjusted so as to compensate for the different lengths of the tax quarters. After the quarterly estimated tax amount has been calculated 104, it is divided by the smallest number of set-aside periods (i.e. weeks) for any of the quarters, which is eight. This amount becomes the set-aside for each period of each quarter. Because the quarters differ in length, it is then necessary to divide the length of each quarter (in days) by eight 150-156 so as to determine how frequently to enact the set-asides 158-164.

The calculation illustrated in FIG. 1G can be expressed as:

$$S_n = (T/I)/\text{MIN}(P_i) \quad (5)$$

$$L_n = D_n/\text{MIN}(P_i) \quad (6)$$

where $L_n$ is the length (in days) of the set-aside period for payment interval n, and $\text{MIN}(P_i)$ is the smallest number of "minimum" set-aside periods in any of the payment intervals i. For example, if the payer has specified that he or she wishes to set aside funds no more often than every week, $\text{MIN}(P_i)$ is the minimum number of weeks in any of the payment intervals $P_i$, which is 8 (from the second quarter).

For example, if a total tax liability of $4000 will be due for the tax year, 8 set-asides/payments of $125 are pre-calculated 148 and scheduled to meet each interval's estimated tax liability of $1,000. The software then divides the number of days in the $1^{st}$ quarter by the same number of periodic set-asides 150, which is eight. In this example, 90 days divided by eight yields a set-aside period of 11.25 days, or 11.375 days in a 91-day leap year Q1. Rounding the decimals down to the nearest whole number means that the aforementioned uniform $125 periodic set-asides will occur 158 every 11 days in the first quarter. Paying the same periodic set-aside amount eight times during the third quarter 154 also leads to set-asides occurring 162 every 11 days, while in the fourth quarter 156, which is the longest, set-asides are made 164 only every 15 days, or twice a month on average.

Various embodiments include a rounding feature, which enables all set-asides to be in whole dollars and an adjustment to take place in the last period (e.g. week) of the payment interval (e.g. quarter). An example is depicted in Table 2: below, in which weekly set-asides for Q1 are $209.00, and the final set-aside for Q1 is $201.00, weekly set-asides for Q2 are $278.00, and the final set-aside for Q2 is $273.00, weekly set-asides for Q3 are $193.00, and the final set-aside for Q3 is $184.00, and weekly set-asides for Q4 are $139.00, and the final set-aside for Q4 is $137.00.

TABLE 2

| Set-aside # | Set-aside Date | Applied to Quarter | Quarterly Set-aside # | Set-aside Amount | Balance in Escrow | IRS EFTPS Debits |
|---|---|---|---|---|---|---|
| | Beginning Balance | | | | $ 0 | |
| 1 | Jan. 7, 2009 | 1 | 1 | $209 | $ 209 | |
| 2 | Jan. 14, 2009 | 1 | 2 | $209 | $ 418 | |
| 3 | Jan. 21, 2009 | 1 | 3 | $209 | $ 627 | |
| 4 | Jan. 28, 2009 | 1 | 4 | $209 | $ 836 | |
| 5 | Feb. 4, 2009 | 1 | 5 | $209 | $ 1,045 | |
| 6 | Feb. 11, 2009 | 1 | 6 | $209 | $ 1,254 | |
| 7 | Feb. 18, 2009 | 1 | 7 | $209 | $ 1,463 | |
| 8 | Feb. 25, 2009 | 1 | 8 | $209 | $ 1,672 | |
| 9 | Mar. 4, 2009 | 1 | 9 | $209 | $ 1,881 | |
| 10 | Mar. 11, 2009 | 1 | 10 | $209 | $ 2,090 | |
| 11 | Mar. 18, 2009 | 1 | 11 | $209 | $ 2,299 | |
| 12 | Mar. 25, 2009 | 1 | 12 | $201 | $ 2,500 | |
| | Quarter 1 IRS Debit | | | | | $ 2,500 |
| 13 | Apr. 1, 2009 | 2 | 1 | $278 | $ 278 | |
| 14 | Apr. 8, 2009 | 2 | 2 | $278 | $ 556 | |
| 15 | Apr. 15, 2009 | 2 | 3 | $278 | $ 834 | |
| 16 | Apr. 22, 2009 | 2 | 4 | $278 | $ 1,112 | |
| 17 | Apr. 29, 2009 | 2 | 5 | $278 | $ 1,390 | |
| 18 | May 6, 2009 | 2 | 6 | $278 | $ 1,668 | |
| 19 | May 13, 2009 | 2 | 7 | $278 | $ 1,946 | |
| 20 | May 20, 2009 | 2 | 8 | $278 | $ 2,224 | |
| 21 | May 27, 2009 | 2 | 9 | $276 | $ 2,500 | |
| | Quarter 2 IRS Debit | | | | | $ 2,500 |
| 22 | Jun. 3, 2009 | 3 | 1 | $193 | $ 193 | |
| 23 | Jun. 10, 2009 | 3 | 2 | $193 | $ 386 | |
| 24 | Jun. 17, 2009 | 3 | 3 | $193 | $ 579 | |
| 25 | Jun. 24, 2009 | 3 | 4 | $193 | $ 772 | |
| 26 | Jul. 1, 2009 | 3 | 5 | $193 | $ 965 | |
| 27 | Jul. 8, 2009 | 3 | 6 | $193 | $ 1,158 | |
| 28 | Jul. 15, 2009 | 3 | 7 | $193 | $ 1,351 | |
| 29 | Jul. 22, 2009 | 3 | 8 | $193 | $ 1,544 | |
| 30 | Jul. 29, 2009 | 3 | 9 | $193 | $ 1,737 | |
| 31 | Aug. 5, 2009 | 3 | 10 | $193 | $ 1,930 | |
| 32 | Aug. 12, 2009 | 3 | 11 | $193 | $ 2,123 | |
| 33 | Aug. 19, 2009 | 3 | 12 | $193 | $ 2,316 | |
| 34 | Aug. 26, 2009 | 3 | 13 | $184 | $ 2,500 | |
| | Quarter 3 IRS Debit | | | | | $ 2,500 |
| 35 | Sep. 2, 2009 | 4 | 1 | $139 | $ 139 | |
| 36 | Sep. 9, 2009 | 4 | 2 | $139 | $ 278 | |
| 37 | Sep. 16, 2009 | 4 | 3 | $139 | $ 417 | |
| 38 | Sep. 23, 2009 | 4 | 4 | $139 | $ 556 | |
| 39 | Sep. 30, 2009 | 4 | 5 | $139 | $ 695 | |
| 40 | Oct. 7, 2009 | 4 | 6 | $139 | $ 834 | |
| 41 | Oct. 14, 2009 | 4 | 7 | $139 | $ 973 | |
| 42 | Oct. 21, 2009 | 4 | 8 | $139 | $ 1,112 | |
| 43 | Oct. 28, 2009 | 4 | 9 | $139 | $ 1,251 | |
| 44 | Nov. 4, 2009 | 4 | 10 | $139 | $ 1,390 | |
| 45 | Nov. 11, 2009 | 4 | 11 | $139 | $ 1,529 | |
| 46 | Nov. 18, 2009 | 4 | 12 | $139 | $ 1,668 | |
| 47 | Nov. 25, 2009 | 4 | 13 | $139 | $ 1,807 | |
| 48 | Dec. 2, 2009 | 4 | 14 | $139 | $ 1,946 | |
| 49 | Dec. 9, 2009 | 4 | 15 | $139 | $ 2,085 | |
| 50 | Dec. 16, 2009 | 4 | 16 | $139 | $ 2,224 | |
| 51 | Dec. 23, 2009 | 4 | 17 | $139 | $ 2,363 | |
| 52 | Dec. 30, 2009 | 4 | 18 | $137 | $ 2,500 | |
| | Quarter 4 - IRS Debit | | | | | $ 2,500 |
| | Totals | | | | $10,000 | $10,000 |

Table 2 presents an example of calculated set-aside amounts and periods for a total tax year liability of $10,000 according to the embodiment of FIG. 1C, including the rounding feature described above. Equal quarterly payments of $2500 are made. During each quarter, equal amounts are set aside every seven days, except for the last period where slightly less is set aside so as to offset the effect of rounding to whole dollars. Due to the unequal lengths of the quarters, the set-aside amount varies substantially between quarters, from a maximum of $278 in the second quarter to a minimum of $139 in the fourth quarter.

Various embodiments allow a user to make adjustments to the calculated set-aside amounts and/or periods, for example so as to anticipate foreseeable events. An example from an embodiment is presented in Table 3 below, where a user has decided to increase the 1st and 2nd quarters by 500 dollars each, and decrease the 3rd quarter, based on the fact that the user is a teacher and his/her income is lower during the summer months.

TABLE 3

| Weekly Set-Aside Amounts and Timing | Weekly Set-Asides in Each Quarter | Total Amount of Quarterly Funds to Escrow | Enter Amounts to Adjust Set-asides in the Quarters Below: To Factor in Catch-up One-Time-Payments select "Decrease by" |
|---|---|---|---|
| $209.00 = Q1 (Jan. 1st-Mar. 31st) Preliminary Set-Aside Amounts | 12 | $2,500.00 | Increase set-asides by $500 in the 1st Quarter |
| $278.00 = Q2 (Apr. 1st-May. 31st) Preliminary Set-Aside Amounts | 9 | $2,500.00 | Increase set-asides by $500 in the 2nd Quarter |
| $193.00 = Q3 (Jun. 1st-Aug. 31st) Preliminary Set-Aside Amounts | 13 | $2,500.00 | Decrease set-asides by $1000 in the 3rd Quarter |
| $139.00 = Q4 (Sep. 1st-Dec. 31st) Preliminary Set-Aside Amounts | 18 | $2,500.00 | Decrease set-asides by $0 in the 4th Quarter |
| | | | $0 Total Adjustments |

The result of entering these adjustments is shown in Table 4 below.

TABLE 4

| Set-aside # | Set-aside Date | Applied to Quarter | Quarterly Set-aside # | Set-aside Amount | Balance in Escrow | IRS EFTPS Debits |
|---|---|---|---|---|---|---|
| | Beginning Balance | | | | $ 0 | |
| 1 | Jan. 7, 2009 | 1 | 1 | $250 | $ 250 | |
| 2 | Jan. 14, 2009 | 1 | 2 | $250 | $ 500 | |
| 3 | Jan. 21, 2009 | 1 | 3 | $250 | $ 750 | |
| 4 | Jan. 28, 2009 | 1 | 4 | $250 | $1,000 | |
| 5 | Feb. 4, 2009 | 1 | 5 | $250 | $1,250 | |
| 6 | Feb. 11, 2009 | 1 | 6 | $250 | $1,500 | |
| 7 | Feb. 18, 2009 | 1 | 7 | $250 | $1,750 | |
| 8 | Feb. 25, 2009 | 1 | 8 | $250 | $2,000 | |
| 9 | Mar. 4, 2009 | 1 | 9 | $250 | $2,250 | |
| 10 | Mar. 11, 2009 | 1 | 10 | $250 | $2,500 | |
| 11 | Mar. 18, 2009 | 1 | 11 | $250 | $2,750 | |
| 12 | Mar. 25, 2009 | 1 | 12 | $250 | $3,000 | |
| | Quarter 1 IRS Debit | | | | | $3,000 |
| 13 | Apr. 1, 2009 | 2 | 1 | $334 | $ 334 | |
| 14 | Apr. 8, 2009 | 2 | 2 | $334 | $ 668 | |
| 15 | Apr. 15, 2009 | 2 | 3 | $334 | $1,002 | |
| 16 | Apr. 22, 2009 | 2 | 4 | $334 | $1,336 | |
| 17 | Apr. 29, 2009 | 2 | 5 | $334 | $1,670 | |
| 18 | May 6, 2009 | 2 | 6 | $334 | $2,004 | |
| 19 | May 13, 2009 | 2 | 7 | $334 | $2,338 | |
| 20 | May 20, 2009 | 2 | 8 | $334 | $2,672 | |
| 21 | May 27, 2009 | 2 | 9 | $328 | $3,000 | |
| | Quarter 2 IRS Debit | | | | | $3,000 |
| 22 | Jun. 3, 2009 | 3 | 1 | $116 | $ 116 | |
| 23 | Jun. 10, 2009 | 3 | 2 | $116 | $ 232 | |
| 24 | Jun. 17, 2009 | 3 | 3 | $116 | $ 348 | |
| 25 | Jun. 24, 2009 | 3 | 4 | $116 | $ 464 | |
| 26 | Jul. 1, 2009 | 3 | 5 | $116 | $ 580 | |
| 27 | Jul. 8, 2009 | 3 | 6 | $116 | $ 696 | |
| 28 | Jul. 15, 2009 | 3 | 7 | $116 | $ 812 | |
| 29 | Jul. 22, 2009 | 3 | 8 | $116 | $ 928 | |
| 30 | Jul. 29, 2009 | 3 | 9 | $116 | $1,044 | |
| 31 | Aug. 5, 2009 | 3 | 10 | $116 | $1,160 | |
| 32 | Aug. 12, 2009 | 3 | 11 | $116 | $1,276 | |
| 33 | Aug. 19, 2009 | 3 | 12 | $116 | $1,392 | |
| 34 | Aug. 26, 2009 | 3 | 13 | $108 | $1,500 | |
| | Quarter 3 IRS Debit | | | | | $1,500 |
| 35 | Sep. 2, 2009 | 4 | 1 | $139 | $ 139 | |
| 36 | Sep. 9, 2009 | 4 | 2 | $139 | $ 278 | |
| 37 | Sep. 16, 2009 | 4 | 3 | $139 | $ 417 | |
| 38 | Sep. 23, 2009 | 4 | 4 | $139 | $ 556 | |
| 39 | Sep. 30, 2009 | 4 | 5 | $139 | $ 695 | |
| 40 | Oct. 7, 2009 | 4 | 6 | $139 | $ 834 | |
| 41 | Oct. 14, 2009 | 4 | 7 | $139 | $ 973 | |

TABLE 4-continued

| Set-aside # | Set-aside Date | Applied to Quarter | Quarterly Set-aside # | Set-aside Amount | Balance in Escrow | IRS EFTPS Debits |
|---|---|---|---|---|---|---|
| 42 | Oct. 21, 2009 | 4 | 8 | $139 | $ 1,112 | |
| 43 | Oct. 28, 2009 | 4 | 9 | $139 | $ 1,251 | |
| 44 | Nov. 4, 2009 | 4 | 10 | $139 | $ 1,390 | |
| 45 | Nov. 11, 2009 | 4 | 11 | $139 | $ 1,529 | |
| 46 | Nov. 18, 2009 | 4 | 12 | $139 | $ 1,668 | |
| 47 | Nov. 25, 2009 | 4 | 13 | $139 | $ 1,807 | |
| 48 | Dec. 2, 2009 | 4 | 14 | $139 | $ 1,946 | |
| 49 | Dec. 9, 2009 | 4 | 15 | $139 | $ 2,085 | |
| 50 | Dec. 16, 2009 | 4 | 16 | $139 | $ 2,224 | |
| 51 | Dec. 23, 2009 | 4 | 17 | $139 | $ 2,363 | |
| 52 | Dec. 30, 2009 | 4 | 18 | $137 | $ 2,500 | |
| | Quarter 4 - IRS Debit | | | | | $ 2,500 |
| | Totals | | | | $10,000 | $10,000 |

A comparison of Table 4 with Table 2 shows that the original summer set-aside (Q3) amount of 193 dollars was reduced to 116 dollars per week. This automated adjustment, recalculating, and rescheduling functionality has enabled the user to reduce his or her summer months set-asides by 77 dollars per week, or 40%, thus making the set-aside schedule more practical for the user to adhere to by transforming a still burdensome set-aside schedule into a more tolerable one.

The same automated recalculating and scheduling functionality can be used when unforeseen circumstances arise, be they windfalls or shortages in income that would affect estimated tax amounts, up and down.

In various embodiments users are able to make numerous adjustments to the set-aside calculation, including but not limited to resetting or overriding the start date for periodic payments, specifying subsequent payments and end dates, if the automatically proposed schedule of periodic payments is not optimal, overriding any specific set-aside payment amount(s) on any date, and substituting a more desirable or more practical schedule. In some embodiments a percentage of income or percentage of deposit formula can be selected.

In certain embodiments, individual set-asides are brought to the attention of the user via reminders that are automatically and/or manually transmitted by email, fax, mail, repetitive calendar settings, or by any other suitable means. In some internet-accessed embodiments hyperlinks are provided in each email notice of an upcoming set-aside, so as to provide easy login and navigation directly to a next set-aside adjustment screen, where the set-aside can be adjusted in amount, held, or cancelled, after which the set-aside schedule can be either re-calculated or left as it is.

One frequent change for US taxpayers performing their original calculations before, or during the early part of the year arises because the original annual tax liability calculation is based on two year old information. Then, during the first quarter, and sometimes in subsequent quarters, the tax return for the year immediately preceding the current year must be taken into account. As an example, if a user manually calculated, or used the present invention described herein to calculate annual tax liability on Jan. 1, 2009, the input numbers would typically be based on earnings, deductions, and credits for the 2007 tax year, since the vast majority of taxpayers do not know the previous year's numbers (for 2008) until a tax return is prepared later in the current year 2009. Taxing authorities mandate that when a material upward change occurs in the newly filed return for a year immediately preceding the current year (in this example 2008), an adjustment increasing the amount of the required payments must be made to avoid penalties. In the event that a downwards change in income has occurred, it is the option of the user to recalculate and reduce periodic tax payments. Because this type of information is usually calculated on or before Apr. 15, 2009, but with extensions, may not be calculated until Oct. 15, 2009, embodiments of the present invention have the built-in functionality and formulae to recalculate changes in tax liability and periodic set-aside amounts at any time. Resulting shortfalls or surpluses in set-asides can be rectified by a single lump payment or refund, by spreading the difference over the remaining set-asides for the tax year, or by any method preferred by the user, including all calculations facilitated by look up tables, algorithms, and/or any arbitrary amount(s) of subsequent set-aside amounts entered by the user for any reason.

Certain embodiments enable users to obtain access to the present invention by enrolling in a user group, which in some embodiments includes a group administrator. Said user group, a partnership for example, in addition to enjoying the freedom of having the information and controls of the invention available to all partners and associates, could also receive some form of compensation, based on revenue received from paying users enrolled in the user group. In some of these user groups, the administrator has full access to information entered, set-aside schedules calculated, transactions enacted, and all other data pertaining to the user group. In other embodiments, the administrator is limited to facilitating and tracking user enrollment, and to establishing and maintaining the availability of the apparatus and method of the invention.

Embodiments of the present invention are able to interface with financial, accounting, and tax software applications, so that enrollment information, tax amounts, schedules, adjustments, reports, etc. can be externally reported through said third party software, and information they contain can be auto-loaded into the apparatus of the current invention.

Some embodiments of the present invention provide different features to different users according to usage levels assigned to the users. For example, some embodiments charge fees for use of the invention, and provide a fee structure that depends on the level of service desired by a user. Other embodiments offer the same features to all users, where those features correspond to one of the user "levels." Some of these embodiments are primarily of interest to individual payers, while others can be of significant utility and benefit to tax accountants, banks, and other organizations and creditors.

Figure 2A:
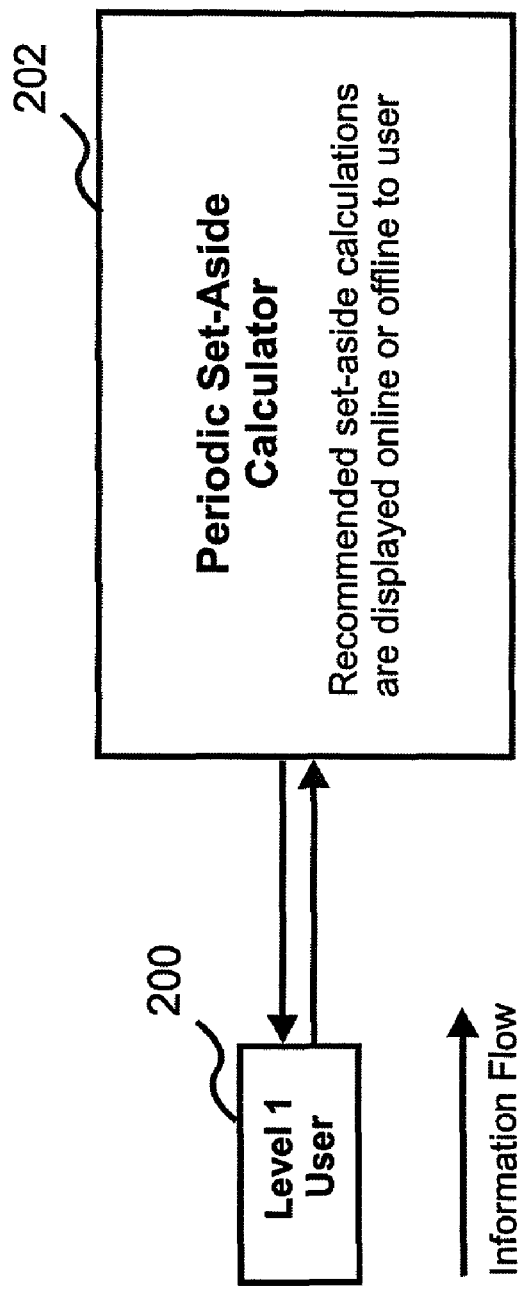
FIG. 2A is a flow diagram illustrating an embodiment that accepts input data from a "level 1" user and calculates therefrom set-aside amounts and intervals under the assumption that the user will separately accrue the recommended side-aside amounts and make the required payments therefrom.

FIG. 2A illustrates an embodiment of the invention that provides basic features to a "level 1" user 200, who accesses the invention either by direct possession and use of an apparatus 202 on which the software of the invention operates, or by interaction with the apparatus 202 over a network such as the internet. The user 200 supplies required information, such as the total amount of the tax or other obligation, when payments are due (including any applicable grace periods), what set-aside period is preferred, the desired manner in which to distribute any overpayment(s) and/or credit(s), and any other information relating to the amount and scheduling of periodic set-asides. The apparatus 202 then calculates a set-aside schedule and provides recommended amounts and periods for the set-asides.

It can be seen from FIG. 2A that information is exchanged only between the user 200 and the apparatus 202. Note that if the Level 1 user 200 wishes instead to input specific amounts to be set-aside, meaning the user 200 can afford or desires to pay said fixed amount, the apparatus 202 will recommend a frequency and/or timing whereby the fixed amount, periodic set-asides should be made. Note also that the user 200 can use a percentage of income, or of deposits, as a basis upon which the apparatus 202 will determine a recommended set-aside schedule. The embodiment of FIG. 2A can be calendar-based or not, and can be accessible either online or offline, using software that is executable on a general purpose computer or on a standalone apparatus.

Figure 2B:
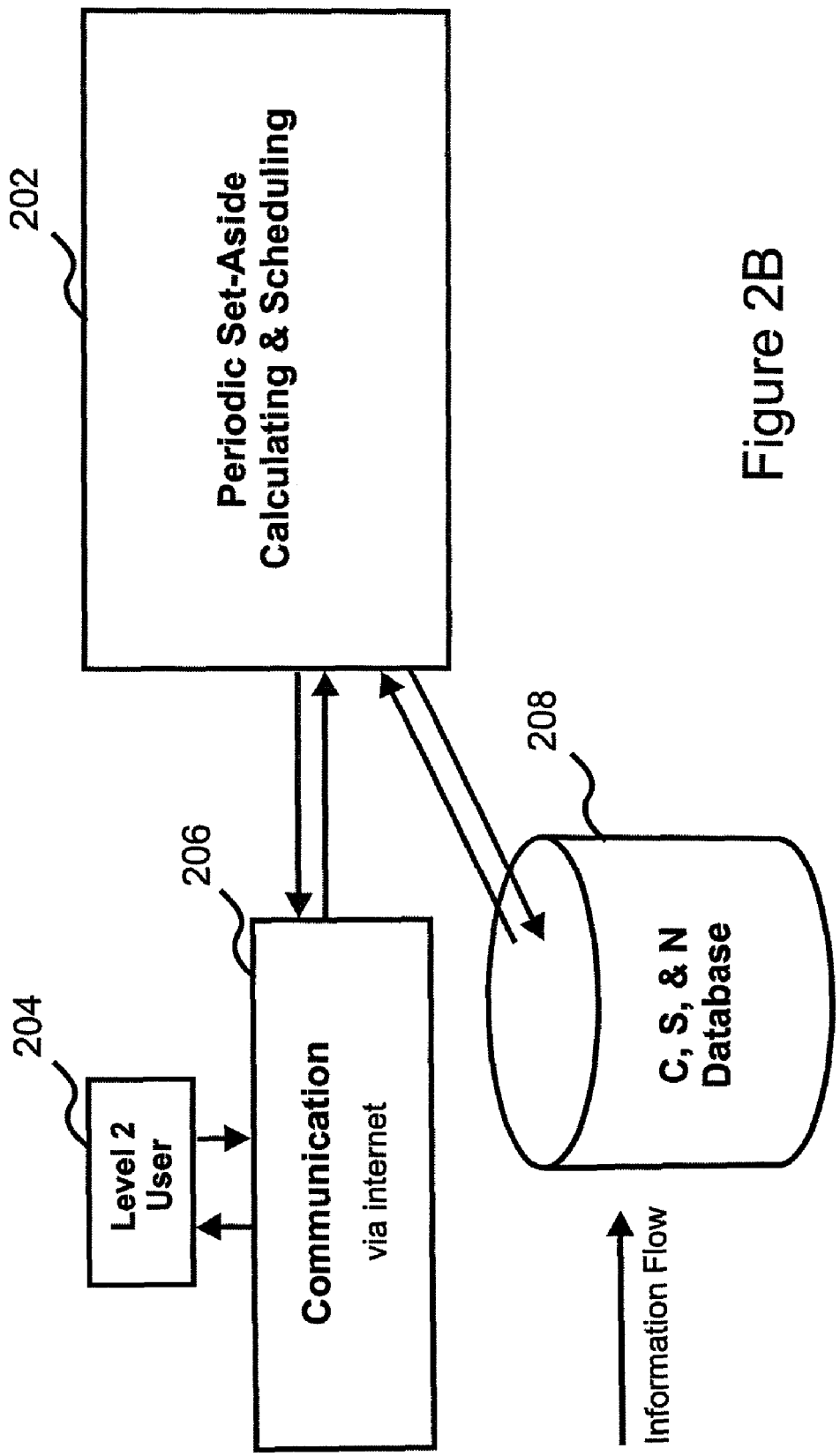
FIG. 2B is a flow diagram illustrating an embodiment that includes all of the features of FIG. 2A, and also stores the input data and calculation results for future reference, while assuming that the user will separately accrue the recommended side-aside amounts and make the required payments therefrom.

FIG. 2B illustrates an embodiment that provides features of the present invention to a "level 2" user 204. The user communicates with the apparatus 202 over the internet 206, and the apparatus 202 stores user-supplied information and the results of calculations in a database 208 or other storage device for future retrieval and use. This feature provides to the user of the invention the ability to recalculate periodic set-aside amounts and/or payments in a more automated fashion, since the user need enter only the changes that are envisioned, are occurring, or have already occurred. To use this feature, the user is only required to provide identifying information, such as a name, a username, a password, and perhaps a secret question/answer as a further identifier, etc. In particular, the user is not required to provide confidential information such as an address, date of birth, taxpayer ID #, etc.

Figure 2C:
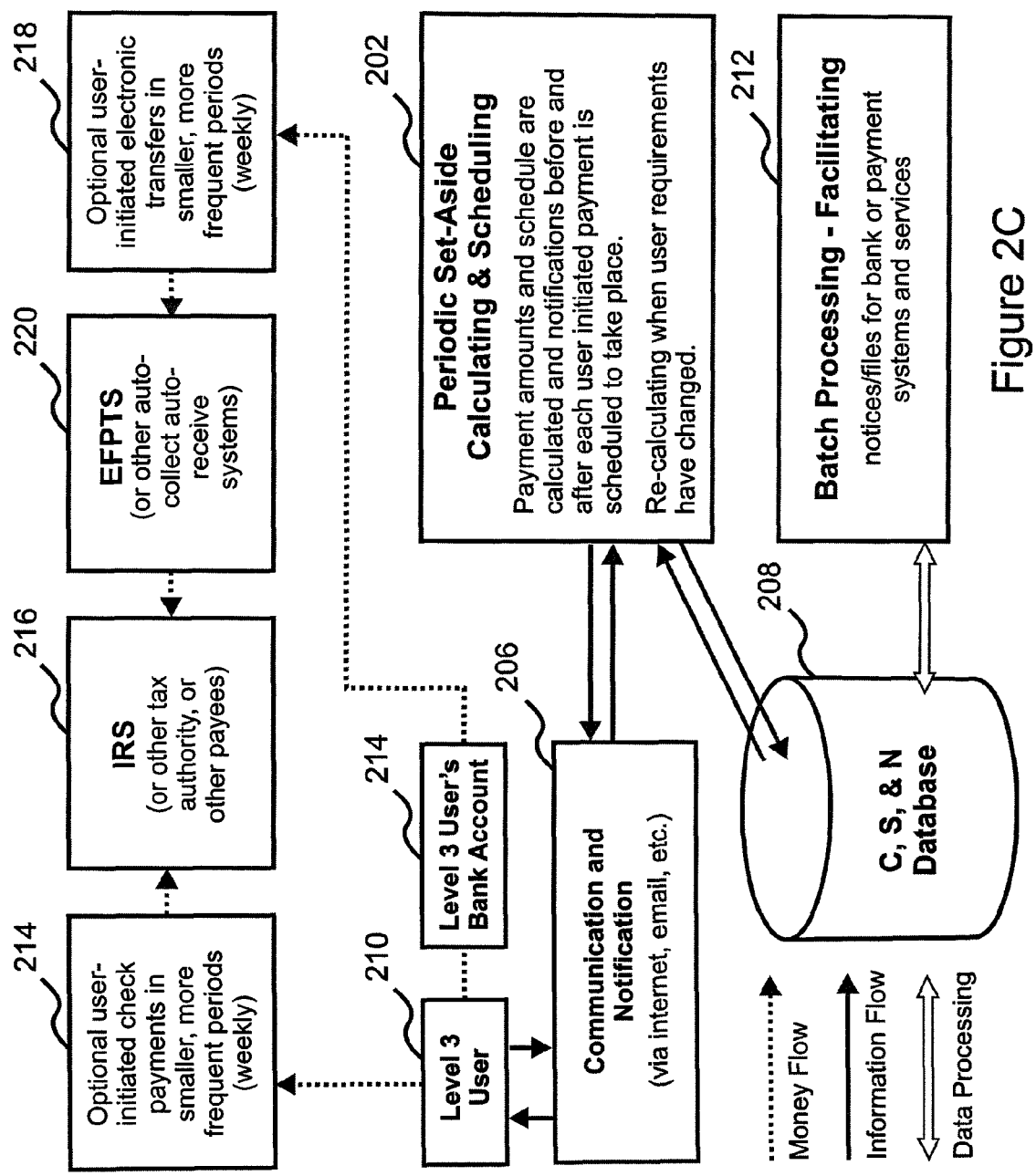
FIG. 2C is a flow diagram illustrating an embodiment that includes all of the features of FIG. 2B, and also transmits notices to the user regarding set-aside amounts, dates, and other information.

FIG. 2C illustrates an embodiment that provides features of the present invention to a "level 3" user 210. At this level, the user 210 communicates with the apparatus of the invention 202 over the internet 206, and also receives notifications from the apparatus. Users can request periodic notifications of set-asides, payments made, number of set-asides remaining in the current interval, and other pertinent information. The notifications can be delivered to the user by any convenient means, such as by online report, by email, by text message, by automated telephone message, by messages auto-inserted in computer controlled calendar schedules, and/or by mail, and can be received using any appropriate means and/or device. Notifications can also include other events that affect the user, including but are not limited to calendar events, user payments or lack of payment events, bank events, and accessibility of the calculation apparatus, in embodiments where the apparatus is accessed over a network such as the internet. The content and timing of these notifications and communications can be individually processed, or as a part of a batch file 212 processed by internal or external logic.

In the embodiment of FIG. 2C, the user 210 may choose to make periodic set-aside, or catch up payments from his or her bank account 214 via check, which can be sent directly to the payee, such as the US federal taxing authority ("IRS") 216. In many territories, taxing authorities, or other payees, have electronic payment options for registered uses of their electronic payment systems 218, such as wire transfers, or debits, which in this embodiment, are initiated by the user, presumably based on periodic set-aside information provided by the invention, and processed by the EFPTS 220 or by a similar system.

For users who have irregular or sporadic income, and who wish to make payments or set-asides according to a percentage of their income, or deposits, the embodiment of FIG. 2C can send a query to the user 210 via notification 206, asking if now is a good time to set aside the percentage amount, based on the embodiment's knowledge of the calendar, payment requirements for this specific user 210 and his or her history.

Embodiments of the present invention can be interfaced with other third party systems, which can automatically, electronically transfer or otherwise debit the periodic set-aside amounts, as determined by the apparatus of the invention.

Figure 2D:
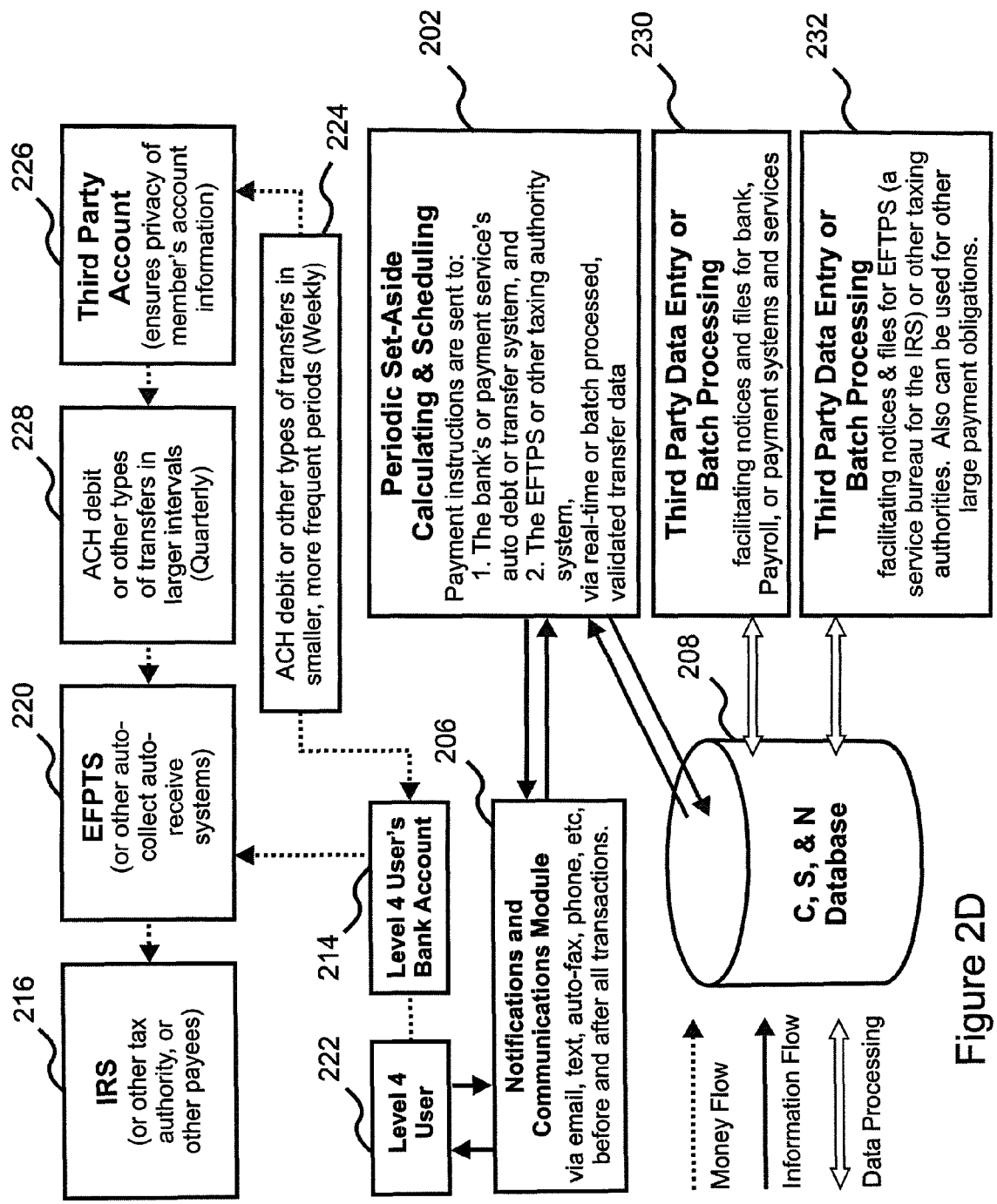
FIG. 2D is a flow diagram illustrating an embodiment that includes all of the features of FIG. 2C, and also provides instructions to a third party escrow and payment service to initiate automated withdrawal of set-aside funds from the user's bank account and payment therefrom of the required payments.

FIG. 2D illustrates an embodiment that provides features of the present invention to a "level 4" user 222. In this embodiment, the user's bank account 214 is interfaced with a third party banking and/or payment system 224, such as the system described in US Patent Application #20080097878, a banking and/or payroll system, an automatic payment transfer and/or debiting system deployed by a taxing authority (the IRS EFTPS system as an example), the payee itself (acting directly as the receiving party), or by any other payment transfer and/or debiting system operated by a third party, such as Western Union, PayPal, etc. The third party payment system 224 is thereby able to act on information provided by the apparatus of the invention 202, or otherwise utilize its calculating, scheduling, notifying and facilitating functionalities, to debit periodic set-aside amounts from the Level 4 user's bank account 214 via ACH or other types of money transfers 226, into an account within his or her control, or within his or her bank's control for safekeeping, in a manner similar to the way in which third parties maintain funds for current banking services, payroll services and/or other functions. The third party payment system 224 then makes the required payments via ACH debit or similar transfer methods 228 to EFTS or another collection system 220, which forwards the payments to the IRS or other payee 216.

In some embodiments the present invention is configured with, or embedded within a third party service 224, such as a creditor's accounting system, tax software preparation and filing systems, bank information systems, payroll systems, online and offline payment systems, and such like, so as to provide additional new functionality, i.e. notifications and communications 230, and/or enhance the collection and payment capabilities 232, as a separate module or service on the third party's existing platform, or as functionality that is compiled into, or otherwise combined with the third party system's source code, data integration/middleware, semantic taxonomies and ontologies, data stores, data marts, data warehouses, CRM systems, screen scraping technologies, business process management servers and business rules engines, etc.

This embodiment can be interfaced with other systems, and can automatically notify the user before, during, and/or after every step of calculating, scheduling, notifying, and facilitating incoming and outgoing payment processes, as well as notifying and recalculating Level 4 users, when anticipated set-aside payments were not received.

Figure 2E:
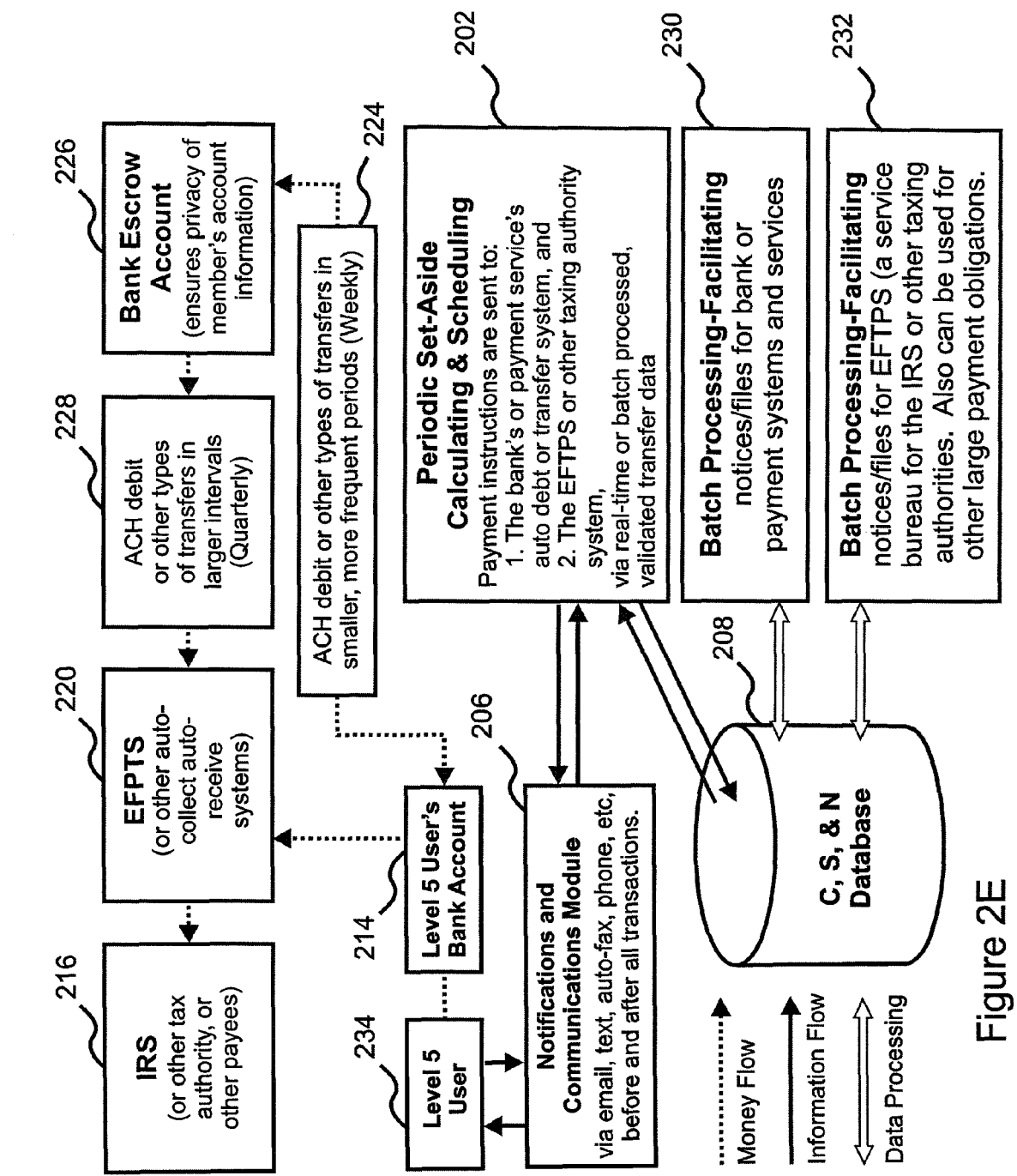
FIG. 2E is a flow diagram illustrating an embodiment that includes all of the features of FIG. 2D, except that the embodiment directly manages the escrow and payment functions by sending appropriate instructions directly to a bank or payment service.

FIG. 2E illustrates an embodiment that provides features of the present invention to a "level 5" user 234. This embodiment is similar to the embodiment of FIG. 2D, but does not require use of a third party payment system, but instead includes the ability to directly send fund transfer instructions to a bank or payment service, such as CheckFree or PayPal, so as to deposit the set-aside funds into a holding account 236 preferably, but not limited to an escrow account, which by nature has third party fiduciary responsibility. Said holding account 236 can facilitate the accrual of interest on the periodic set-aside amounts deposited therein, until the larger payment for the current interval is made 228, usually via automated payment systems like the EFTPS 230, at which time the Level 5 user 234 can receive rebates in the amount of the accrued interest on the set-aside payments, should an interest-bearing account, or side-wiping interest earning account, such as a money market account, be utilized.

The escrow account 236 can be opened in the Level 5 user's own name, or it can be a part of a larger escrow account that aggregates set-asides from multiple system users. This account may or may not accrue interest until such time as funds are disbursed 228, presumably at the time specified by the taxing authority or other payee for the interval. The embodiment can calculate the interest, and distribute it via a batch process to each Level 5 user in pro-rated amounts. For users with accounts in their own names, interest is calculated by the bank or other institution and reported to the user 234, either directly or through the apparatus of the embodiment.

If needed, the Level 5 user 234 can withdraw all or part of the funds in escrow, in case of emergency or at any time and for any reason, as indicated by the bi-directional arrow in FIG. 2E (via 224 between 214 and 236). This feature is especially important for entrepreneurs and other self-employed individuals who may need to use the tax money for business or other purposes, be they routine or extraordinary in nature.

All notifications 206 can be sent individually, or accomplished via batch notification 238, and all transactions can be facilitated by the embodiment individually or via batch processing 240.

While the discussion above is directed toward compliance with a single financial obligation, it will be clear to those of average skill in the art that the invention can be used to facilitate simultaneous compliance with a plurality of financial obligations. In various of these embodiments, separate set-aside schedules are calculated as described above for each of the obligations, and then the separate set-aside schedules are combined into a unified schedule, typically by synchronizing the set-aside periods and simply adding together the set-aside amounts from the separate set-aside schedules. In some of these embodiments, the payer specifies a prioritizing preference that indicate how set-aside funds should be allocated among the obligations in case a shortfall occurs, for example if the payer is not able to fully adhere to the unified set-aside schedule due to unforeseen circumstances or for any other reason.

Figure 3:
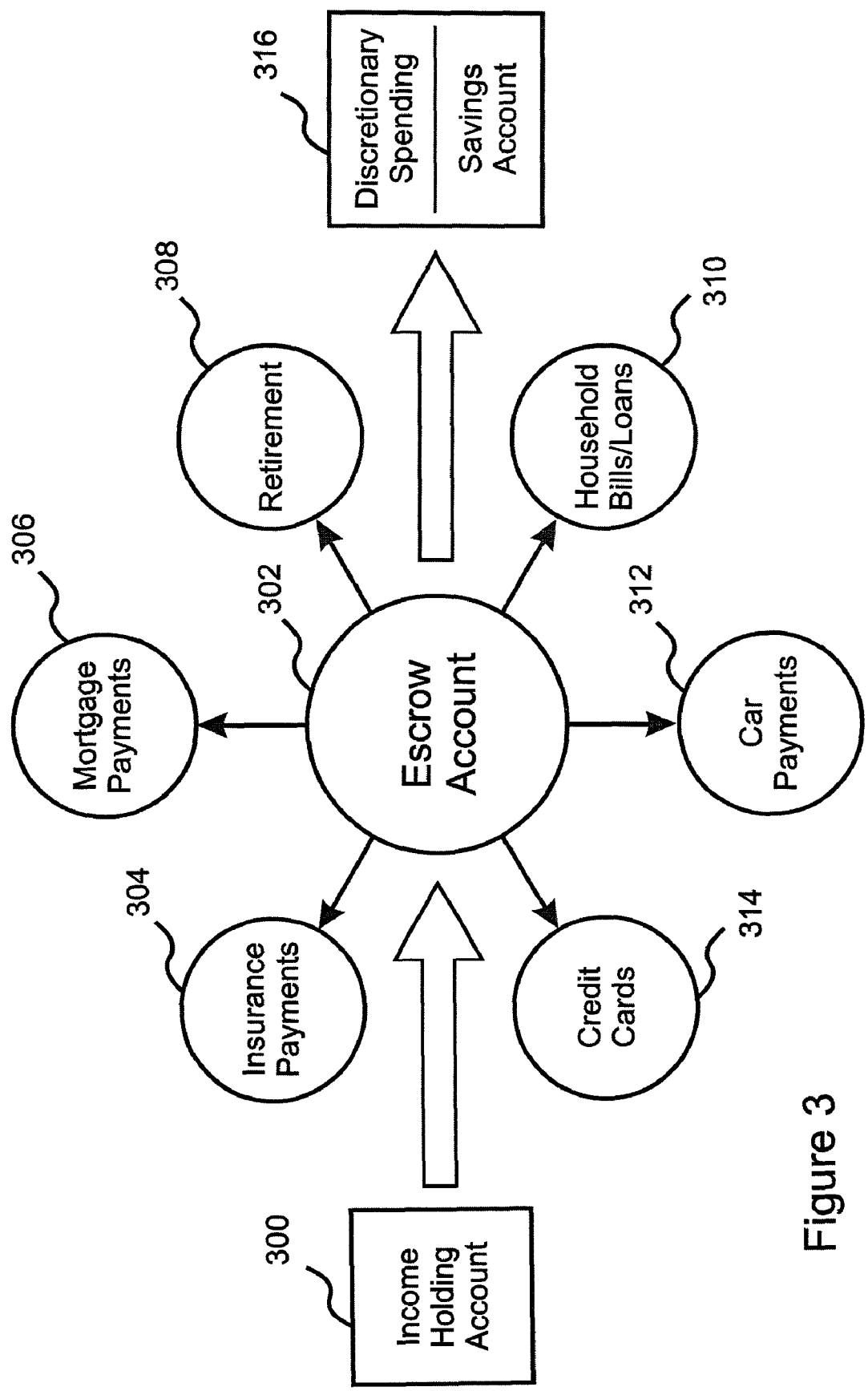
FIG. 3 is a flow diagram illustrating an embodiment that intercepts the income of a payer, sets aside funds in anticipation of paying a plurality of financial obligations, and provides the remaining funds to the payer for discretionary spending and for saving.

With reference to FIG. 3, in some embodiments of the present invention income received by the payer is initially placed in an income holding account 300, from which set-aside amounts are periodically transferred to an escrow account 302 according to one or more set-aside schedules. The calculating of the set-aside schedules is facilitated by one or more instances of the functionality of the present invention in combination with a synchronizing logic layer, or a combined, RETE-based accrual and payment engine, or both. Payments are then made from the escrow account 302 toward the one or more financial obligations 304-314 according to their amounts and due-dates. If insufficient funds are available to make all scheduled payments, user-specified priorities, prudence, best practices, and creditor policies are applied to allocate available funds among the financial obligations 304-314.

Any funds remaining in the income holding account 300 that are not needed for the set-aside account 302 are transferred to a discretionary spending account and/or to a savings account 316. In some embodiments, the system can be queried by computer, and/or by voice recognition software, as to whether a certain planned expenditure can be afforded. The system then uses the RETE algorithm, ontologies with rational agents, inference engines, and/or other tools to consider a number of factors and provide a response such as "yes," "no," or "somewhat." The "somewhat" response, for example, can indicate that credit scores will likely be negatively impacted if more than a certain amount is expended from the discretionary spending account at that time, because maximum flexibility requires a certain balance to be maintained in the discretionary spending account.

Any interest received due to funds held in the income holding account 300, the escrow account 302, and/or the discretionary spending and savings accounts 316 accrues for the benefit of the payer. While the payer normally does not deposit or withdraw funds directly to or from the income holding account 300 or the escrow account 302, the payer can do so at any time and for any reason, typically to meet the requirements of an emergency or to take advantage of an unanticipated opportunity.

Various embodiments of the present invention enable creditors to join together and/or to individually participate in the commercialization of bank accounts or other accounts as depicted in FIG. 3, by accepting minimum and expected payments, like credit card companies, instead of only fixed equal payments. They can also use the present invention as a flexible collection system that has the intelligence to make and monitor most work-out arrangements, thereby reducing labor in work-out departments.

It will be readily apparent that there are numerous and varied other embodiments and examples of the invention. For example, there is a computer-enabled method for improving compliance of a payer subject to a financial obligation by use of periodic set-asides of funds sufficient to make required payments in accordance with terms of the obligation, comprising using a computer-based system that has at least a processor, database, and payer interface; establishing and storing in memory a next available set-aside date and a due date for a next required payment; determining and storing in memory a payment amount for the next required payment; establishing and storing in memory compliance preferences including a preferred set-aside period and amount per period to be set aside; calculating and storing in memory a set-aside schedule as a function of the next available set-aside date, the due date, the payment amount, and the compliance preferences, the calculated set-aside schedule that includes a plurality of set-aside amounts and a plurality of corresponding set-aside dates, whereby a total of the set-aside amounts is at least equal to the payment amount; displaying the calculated set-aside schedule to the payer; enabling the payer to accept or adjust the calculated set-aside schedule and, if adjusted, overwriting the stored set-aside schedule with the adjusted set-aside schedule.

The method may include or require recalculating the adjusted set-aside schedule based on stored data; displaying the recalculated set-aside schedule to the payer; and enabling the payer to accept or adjust the calculated set-aside schedule and, if adjusted, overwriting the stored set-aside schedule with the adjusted set-aside schedule. The method may be repeated once or periodically, or whenever the user is summoned by a system notice or decides to access the system for information or to take action.

The method may include the computer-based system having data links to selected financial institutions controlling selected financial accounts, and further provide for transferring an amount of funds equal to the scheduled set-aside amount, on the scheduled set-aside date, by means of one or more data messages, from a source account associated with the payer to a holding account wherein set-aside amounts are accrued until the due date; transferring the payment amount, on the due date, by means of one or more data messages, from the holding account to a receiving account associated with a beneficiary of the obligation; and storing in memory a record of the transferred amount as a reduction to the holding account and a corresponding reduction to the obligation. The record may be stored as merely a pending reduction of the obligation in accordance with pre-established rules of the financial institutions until the transfer of the payment amount is confirmed; and then be updated as a confirmed payment. The holding account being associated with the payer as an escrow account, perhaps interest bearing, and over which the payer has continuing control including final authorization as to making a payment or reclaiming the funds for other purposes.

Determining the payment amount of the next required payment may involve entering and storing an estimated total amount for the obligation; determining and storing amounts of previous payments and credits reducing the obligation; calculating and storing the next payment amount as a function of the total amount of the obligation less the previous payments and credits, and the terms of the obligation by which payment intervals, due dates and amounts are determinable. The obligation may be an estimated one year tax obligation in accordance with U.S. Internal Revenue Code, where the payments are quarterly payments in accordance with requirements for estimated tax obligations under the Internal Revenue Code. The method may utilize any of the aforementioned equations or other suitable algorithms for calculating optimal set-aside schedules to meet payment requirements for tax or other types of obligations.

The invention contemplates multiple payers subject to respective obligations, with respective holding accounts being associated with a common third party payment service. It further contemplates multiple payers such as taxpayers subject to respective obligations, such as tax obligations, of which there is a common beneficiary, such as the IRS.

The computer-based system may have data links to selected financial institutions controlling selected financial accounts, and the method may include storing in memory a record relating to a source account associated with the payer so as to identify an amount of set-aside funds in a source account equal to the scheduled set-aside amount, on the scheduled set-aside date, by means of one or more data messages, whereby the record indicates the accrued amount of set-aside funds in the source account until the due date; and transferring the payment amount, on the due date, by means of one or more data messages, from the source account to a receiving account associated with a beneficiary of the obligation; and storing in memory a record of the transferred amount as a reduction to the source account and a corresponding reduction to the obligation.

The source account of a payer may be multiple source accounts associated with a common payer, and his compliance preferences may include rules by which set asides are charged to selected source accounts, including stock or other types of asset accounts where a set-aside is obtained by a loan from a third party with the asset account performing as collateral, all of this being executed by data messages according to pre-established rules and payer preferences. Likewise, the payer may have multiple obligations being serviced by the system and method of the invention, where his compliance preferences include rules by which set asides and corresponding payments are allocated among the various obligations.

In another variation of the invention, the payer subject to a financial obligation may be multiple tax payers subject to respective estimated tax obligations of which the Internal Revenue Service is a common beneficiary, wherein the computer-based system has data links to selected financial institutions controlling selected financial accounts, and the method further provides for transferring an amount of funds equal to the scheduled set-aside amount, on the scheduled set-aside date, by means of one or more data messages, from individual source accounts associated with respective taxpayers to a respective sub-account of a common holding account, wherein set-aside amounts are combined but accrued on behalf of the respective taxpayer until the due date; and transferring by batch file instructions the combined payment amount, on the common due date, by means of one or more data messages, from the holding account to an Internal Revenue Service receiving account, with instructions for apportioning the combined payment among the respective individual taxpayer tax accounts; and storing in memory for the payers' review and benefit a record of the transferred amount as a reduction to the holding account and the sub-accounts of the individual taxpayers and a corresponding reduction to their respective individual tax obligations.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-enabled method for improving compliance of a payer subject to a financial obligation by use of periodic set-asides of funds sufficient to make required payments in accordance with terms of the obligation, the financial obligation having at least one required payment associated with at least one required payment interval, the method comprising:
    using a computer-based system comprising a processor, database, and payer interface, establishing and storing in memory a next available set-aside date and a due date for each required payment;
    determining and storing in memory a payment amount for each required payment;
    ascertaining and storing in memory compliance preferences including a preferred set-aside period length and a preferred set-aside amount to be set aside during each set-aside period;
    calculating and storing in memory a set-aside schedule as a function of the next available set-aside date, the due date, the payment amount, and the compliance preferences, the calculated set-aside schedule comprising a plurality of set-aside amounts and a plurality of corresponding set-aside dates, whereby a total of the set-aside amounts is at least equal to the payment amount, each set aside amount $S_n$ being calculated using an equation $$S_n = (T/I)/P_i$$

where the individual set-aside periods are indexed by the variable n, T is the total amount of the financial obligation, the total number of required payment intervals is I, the payment intervals are indexed by the variable i ranging from 1 to I and $P_i$ is the number of set-aside periods available in the payment interval in which the $n^{th}$ set-aside period occurs;
    displaying the calculated set-aside schedule to the payer;

enabling the payer to accept or adjust the calculated set-aside schedule; and if the set-aside schedule is adjusted, overwriting the stored set-aside schedule with the adjusted set-aside schedule.

2. The method of claim 1, further comprising:

recalculating the adjusted set-aside schedule based on stored data;

displaying the recalculated set-aside schedule to the payer;

enabling the payer to accept or adjust the recalculated set-aside schedule; and if the recalculated set-aside schedule is adjusted, overwriting the stored set-aside schedule with the adjusted recalculated set-aside schedule.

3. The method of claim 1, wherein said computer-based system comprises data links to selected financial institutions controlling selected financial accounts, the method further comprising:

transferring an amount of funds equal to a scheduled set-aside amount, on a correspondingly scheduled set-aside date, by means of one or more data messages, from a source account associated with the payer to a holding account wherein set-aside amounts are accrued until the due date;

transferring the payment amount, on the due date, by means of one or more data messages, from the holding account to a receiving account associated with a beneficiary of the obligation; and storing in memory a record of the transferred amount as a reduction to the holding account and a corresponding reduction to the obligation.

4. The method of claim 3, said storing in memory a record comprising:

storing a record of the transferred amount as a pending reduction of the obligation in accordance with pre-established rules of the financial institutions until the transfer of the payment amount is confirmed; and updating the record as a confirmed payment.

5. The method of claim 3, said holding account being associated with the payer as an escrow account.

6. The method of claim 5, said determining the payment amount of the next required payment comprising:

entering and storing an estimated total amount for the obligation;

determining and storing amounts of previous payments and credits reducing the obligation; and calculating and storing the next payment amount as a function of the total amount of the obligation less the previous payments and credits, and the terms of the obligation by which payment intervals, due dates and amounts are determinable.

7. The method of claim 6, said obligation being an estimated one year tax obligation in accordance with U.S. Internal Revenue Code, said payments being quarterly payments in accordance with terms of estimated tax obligations under the U.S. Internal Revenue Code.

8. The method of claim 3, said payer subject to a financial obligation comprising multiple payers subject to respective obligations, respective said holding accounts being associated with a common third party payment service.

9. The method of claim 1, said payer subject to a financial obligation comprising multiple payers subject to respective obligations of which there is a common beneficiary.

10. The method of claim 9, said payers being tax payers, said respective obligations being respective estimated tax obligations, said common beneficiary being a common tax authority.

11. The method of claim 1, wherein said computer-based system comprises data links to selected financial institutions controlling selected financial accounts, further comprising:

storing in memory a record relating to a source account associated with the payer so as to identify an amount of set-aside funds in a source account equal to the scheduled set-aside amount, on the scheduled set-aside date, by means of one or more data messages, whereby the record indicates the accrued amount of set-aside funds in the source account until the due date; and transferring the payment amount, on the due date, by means of one or more data messages, from the source account to a receiving account associated with a beneficiary of the obligation; and storing in memory a record of the transferred amount as a reduction to the source account and a corresponding reduction to the obligation.

12. The method of claim 3, said source account comprising multiple source accounts associated with a common payer, said compliance preferences comprising rules by which set asides are charged to selected said source accounts.

13. The method of claim 3, said obligation comprising multiple obligations, said compliance preferences comprising rules by which set asides and corresponding payments are allocated to selected said obligations.

14. The method of claim 1, said payer subject to a financial obligation comprising multiple tax payers subject to respective estimated tax obligations of which a taxing authority is a common beneficiary, wherein said computer-based system comprises data links to selected financial institutions controlling selected financial accounts, further comprising:

transferring an amount of funds equal to the scheduled set-aside amount, on the scheduled set-aside date, by means of one or more data messages, from individual source accounts associated with respective taxpayers to a respective sub-account of a common holding account, wherein set-aside amounts are combined but accrued on behalf of the respective taxpayer until the due date; and transferring by batch file instructions the combined payment amount, on the common due date, by means of one or more data messages, from the holding account to an Internal Revenue Service receiving account, with instructions for apportioning the combined payment among the respective individual taxpayer tax accounts; and storing in memory a record of the transferred amount as a reduction to the holding account and the sub-accounts of the individual taxpayers and a corresponding reduction to their respective individual tax obligations.

* * * * *